United States Patent [19]

Ogawa

[11] Patent Number: 5,038,331
[45] Date of Patent: Aug. 6, 1991

[54] MULTI-DISK PLAYER

[75] Inventor: Masaya Ogawa, Saitama, Japan

[73] Assignee: Pioneer Electronic Corporation, Tokyo, Japan

[21] Appl. No.: 503,572

[22] Filed: Apr. 3, 1990

[30] Foreign Application Priority Data

May 2, 1989 [JP] Japan .................................. 1-113358

[51] Int. Cl.$^5$ ...................... G11B 17/22; G11B 33/02
[52] U.S. Cl. ........................................ 369/36; 369/37; 369/38; 369/39; 369/75.200; 369/77.100
[58] Field of Search ........................ 369/36, 37, 38, 39, 369/77.1, 77.2, 75.2, 191, 194

[56] References Cited

U.S. PATENT DOCUMENTS

| | | | |
|---|---|---|---|
| 4,737,445 | 4/1988 | Yamazaki et al. | 369/36 |
| 4,788,673 | 11/1988 | Ikedo et al. | 369/36 |
| 4,841,499 | 6/1989 | Takahashi et al. | 369/36 X |
| 4,890,276 | 12/1989 | Ono et al. | 369/194 X |

Primary Examiner—David Trafton
Assistant Examiner—Tien Ba Pham
Attorney, Agent, or Firm—Sughrue, Mion, Zinn, Macpeak & Seas

[57] ABSTRACT

A multi-disk player having a magazine for accommodating plural disks and a playback means. The playback means moves along an axis parallel to the axis of alignment of the disk in the magazine to a position adjacent a selected disk. The selected disk is extracted from the magazine and moved to a playback position in the playback means. Movement of the disk is under control of a motor, a movable member which responds to the motor and a tray engagement member which is actuated by the movable member. The movable member also actuates camming mechanisms which control the clamping and unclamping of the disk in the playback position and the unlocking and locking of the pick up means.

13 Claims, 27 Drawing Sheets

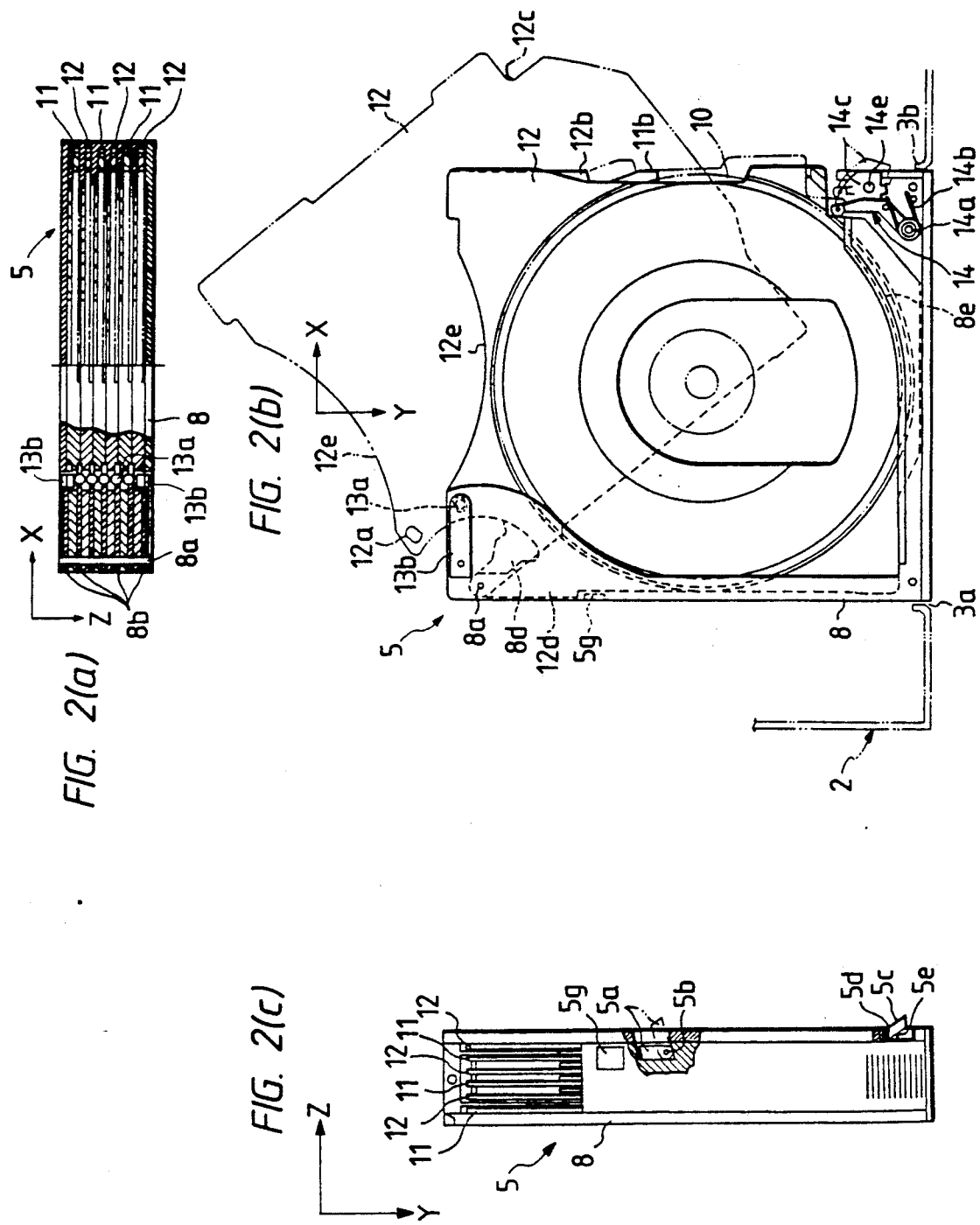

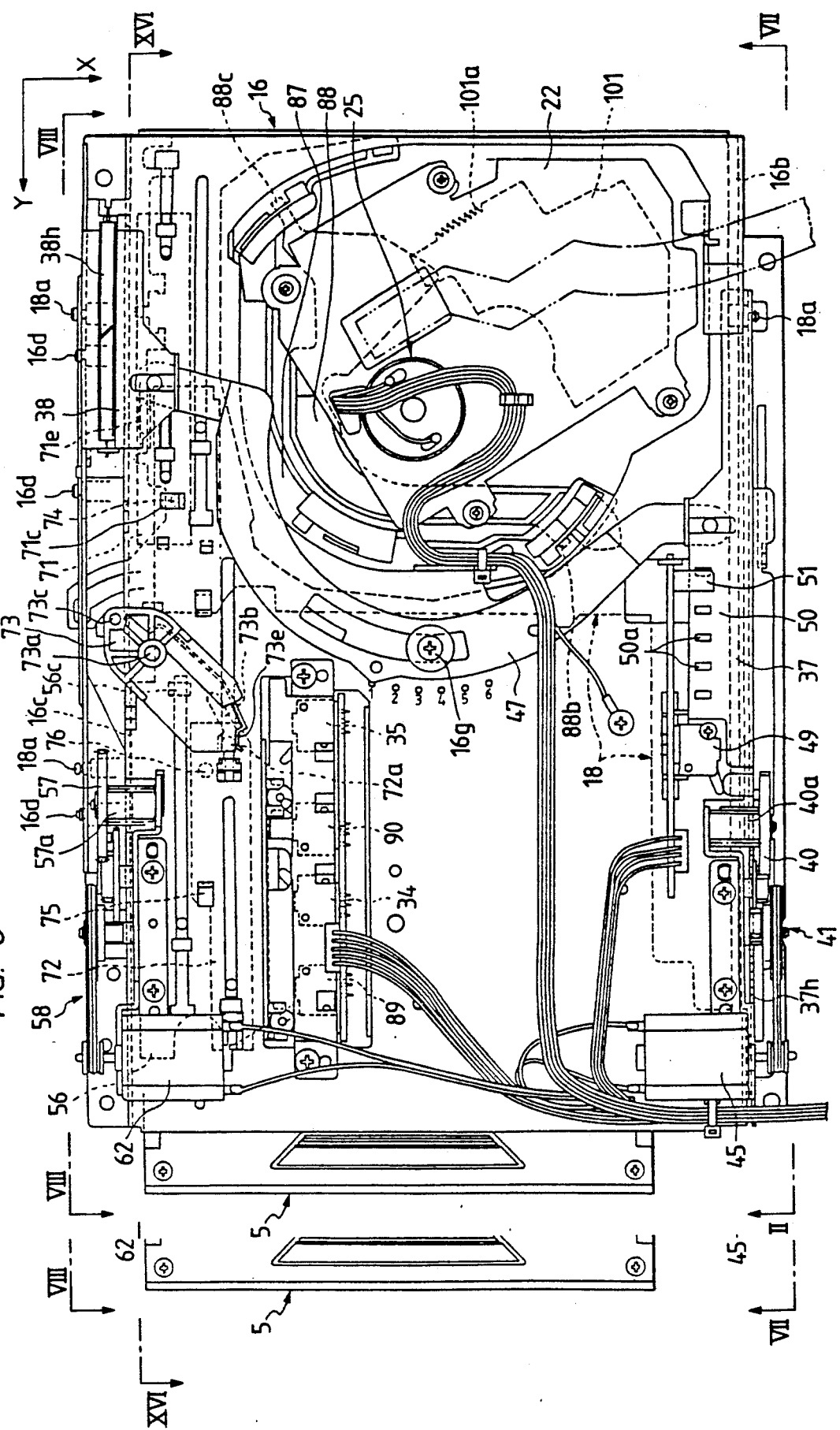

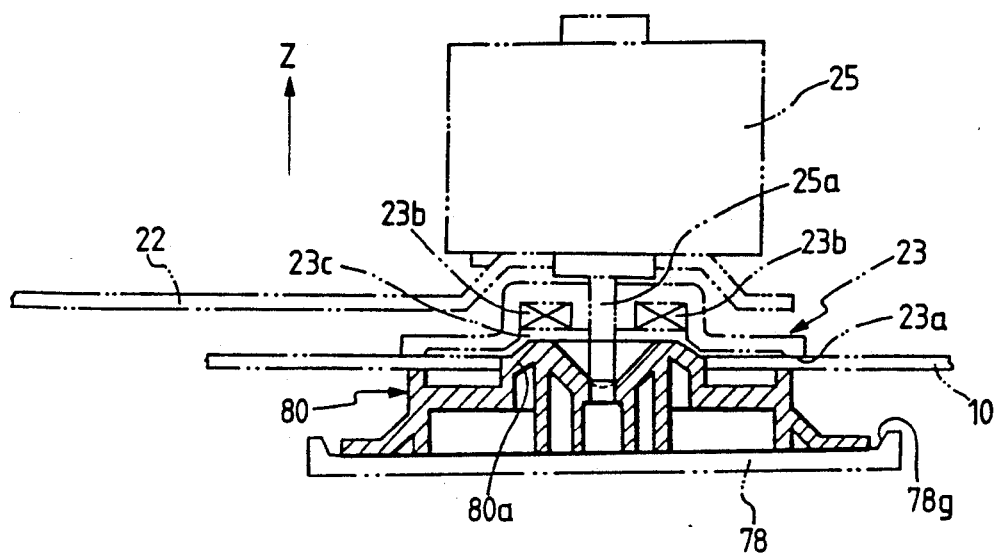
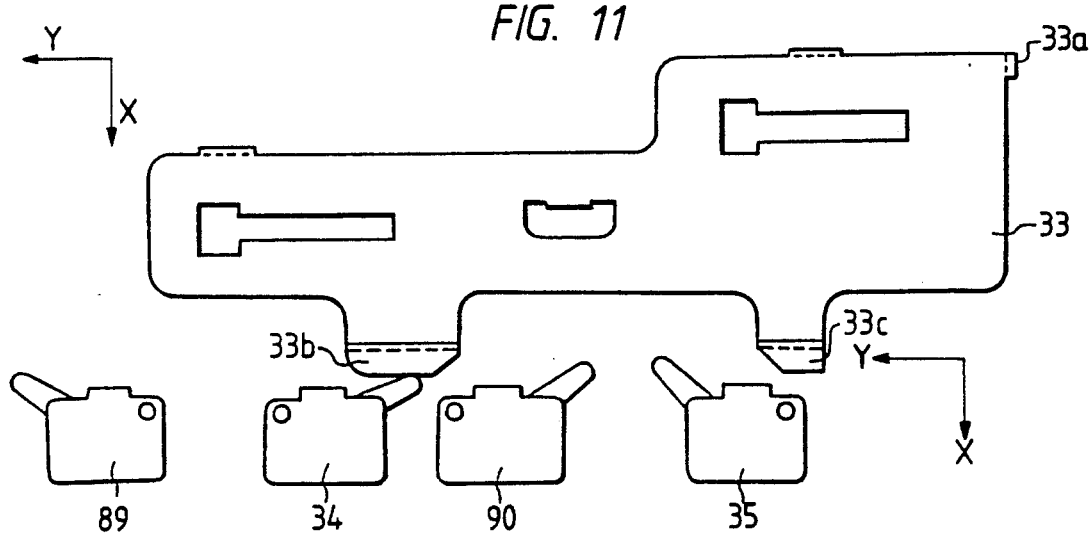

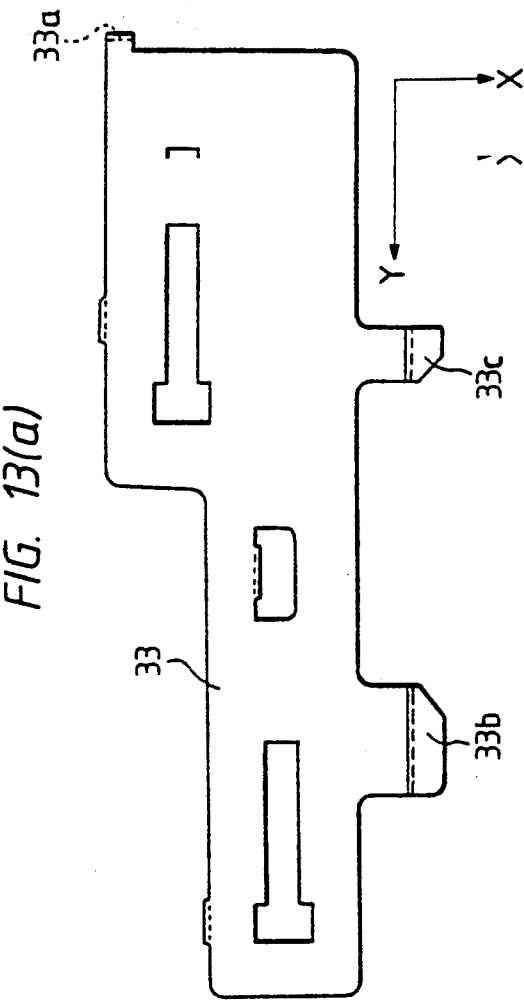
FIG. 13(a)
FIG. 13(b)
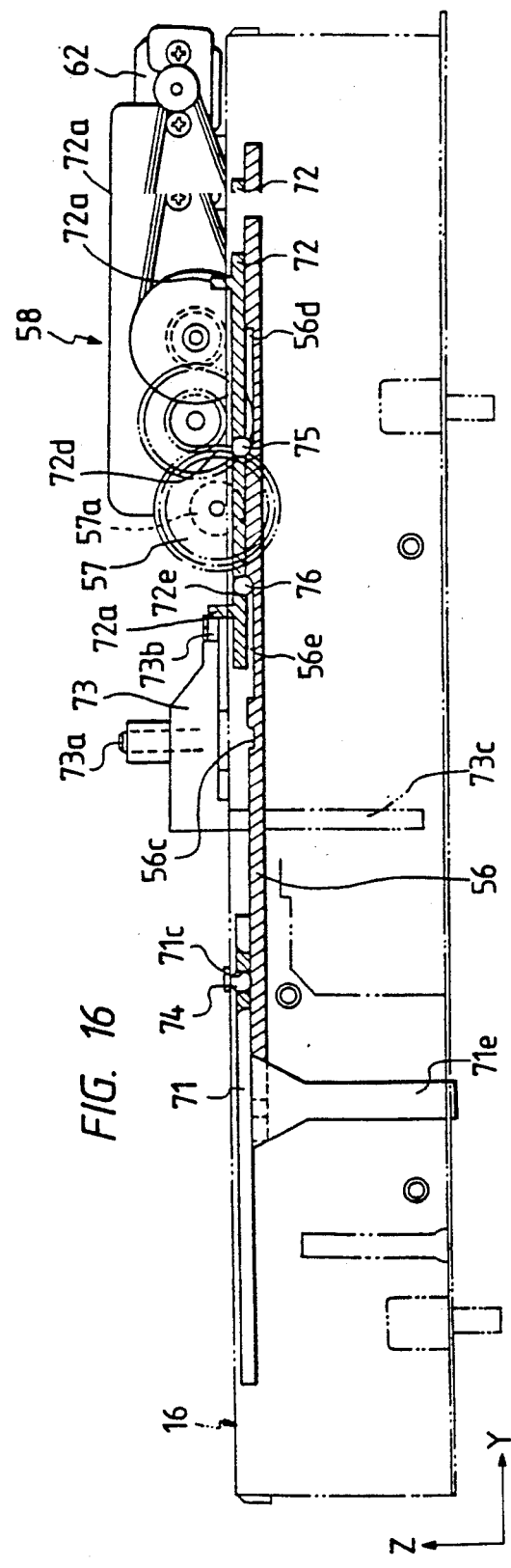
FIG. 16

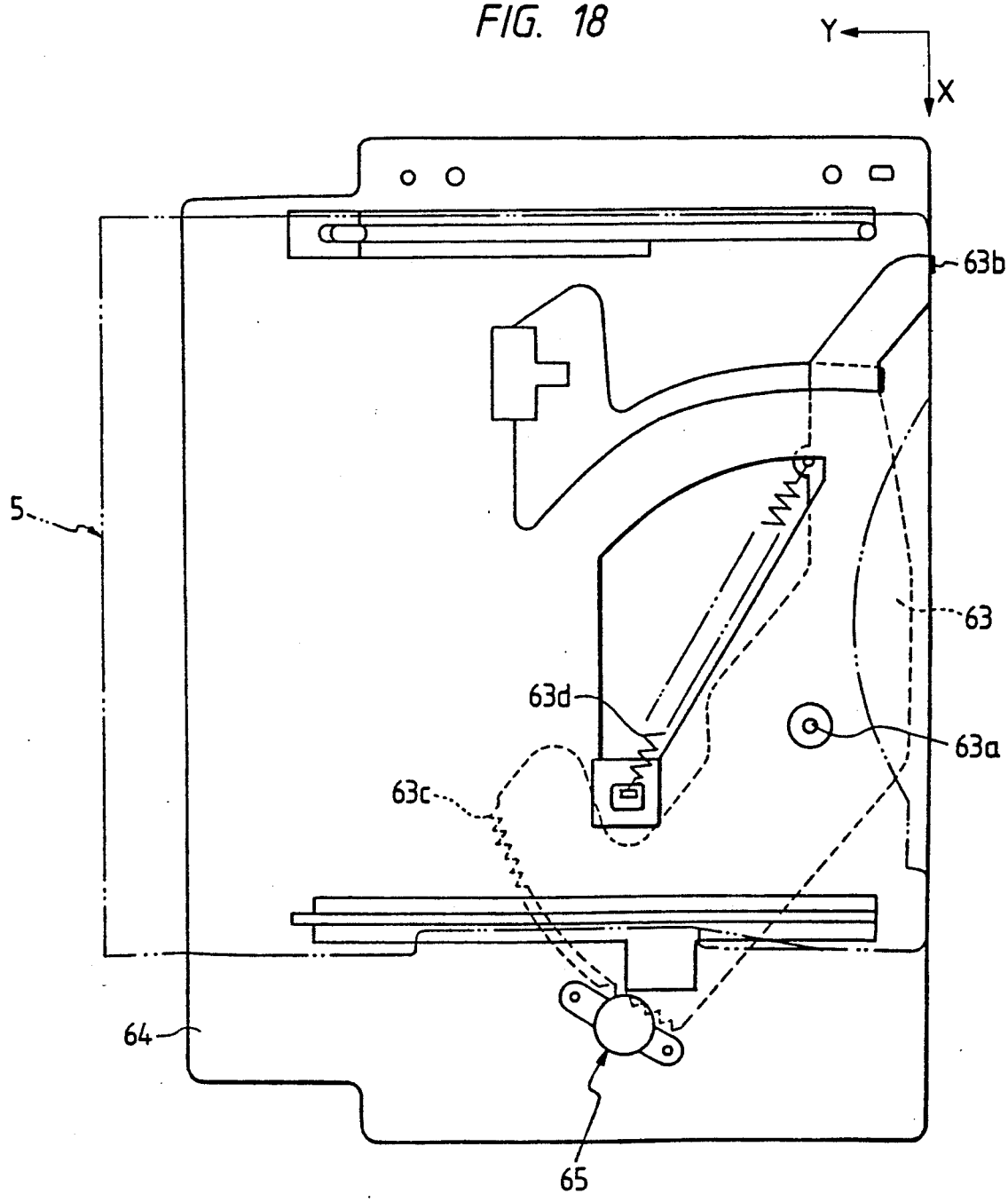

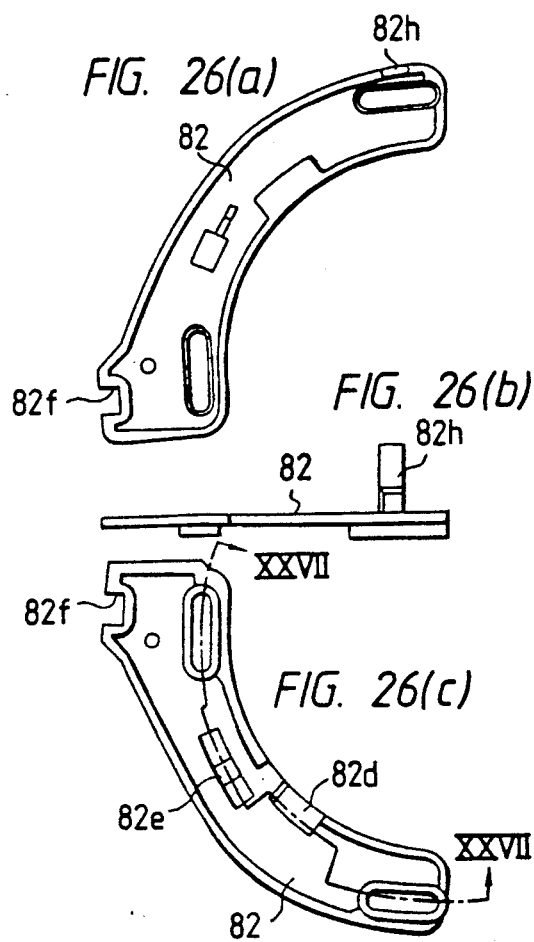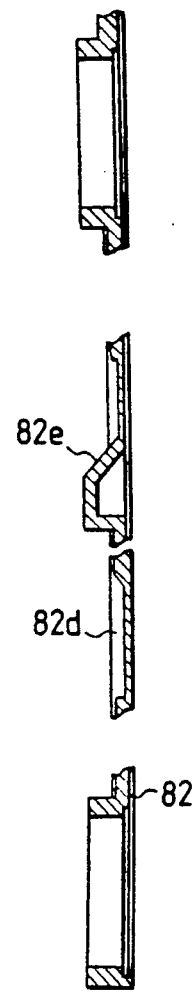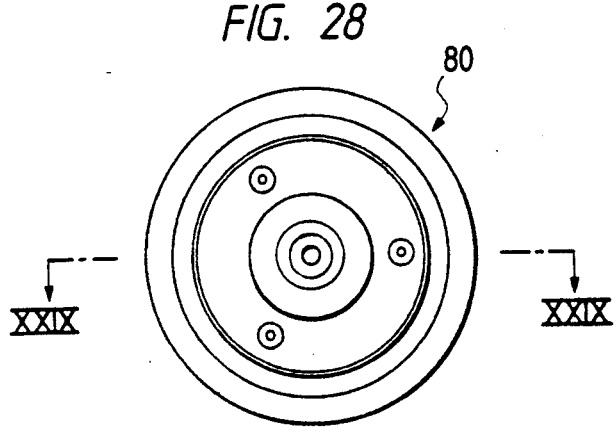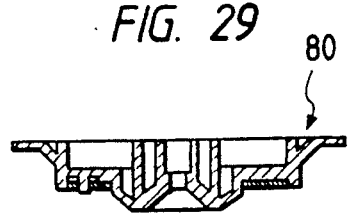

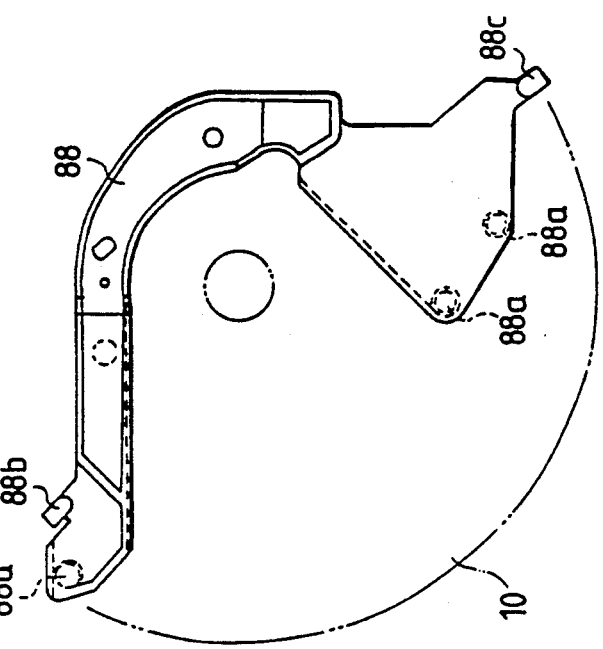
FIG. 31(a)
FIG. 31(b)
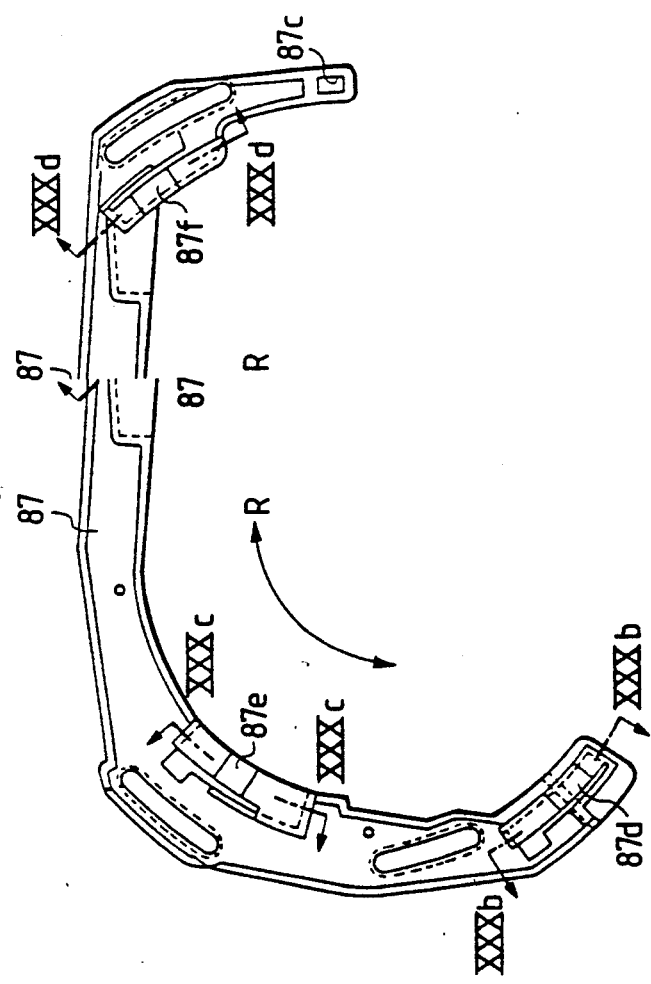
FIG. 30(a)
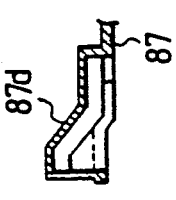
FIG. 30(b)
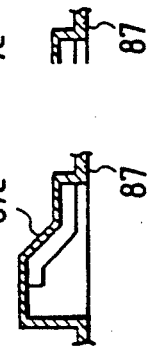
FIG. 30(c)
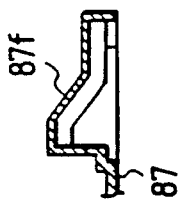
FIG. 30(d)

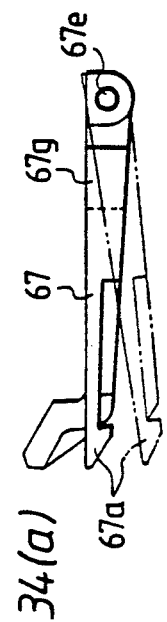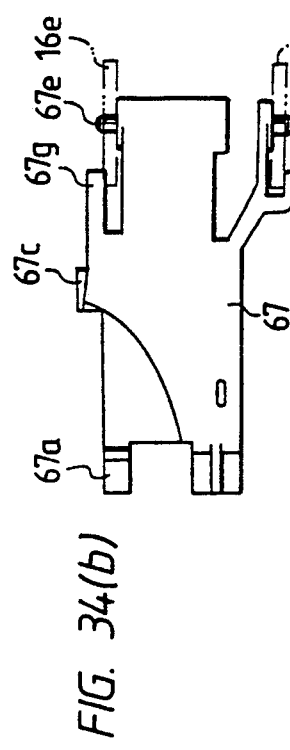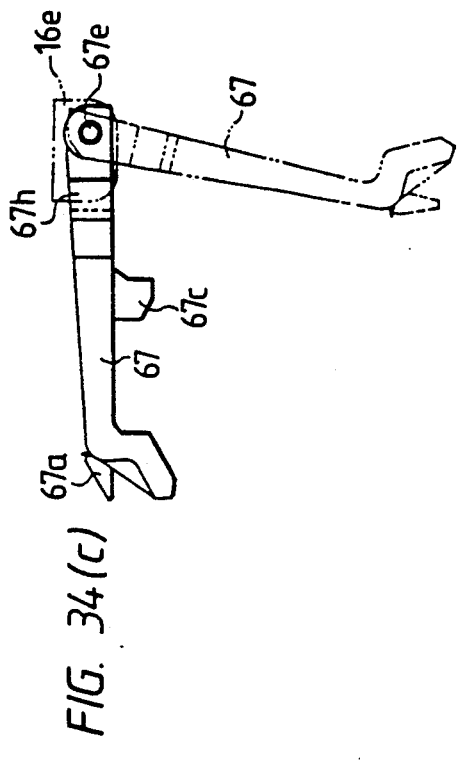
FIG. 34(a)　FIG. 34(b)　FIG. 34(c)
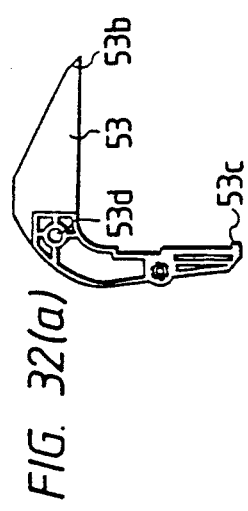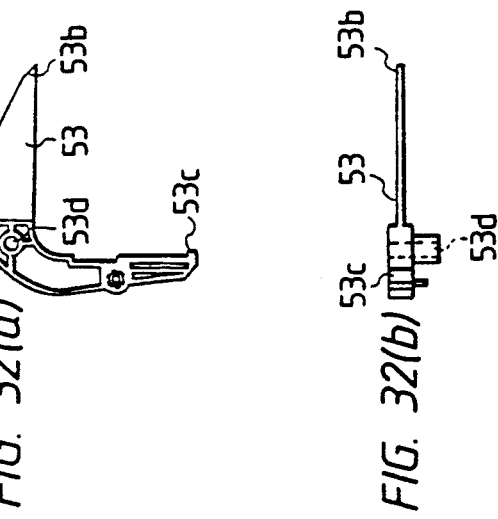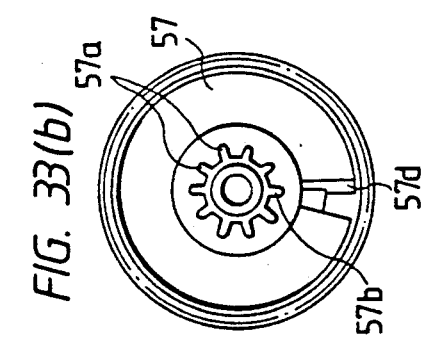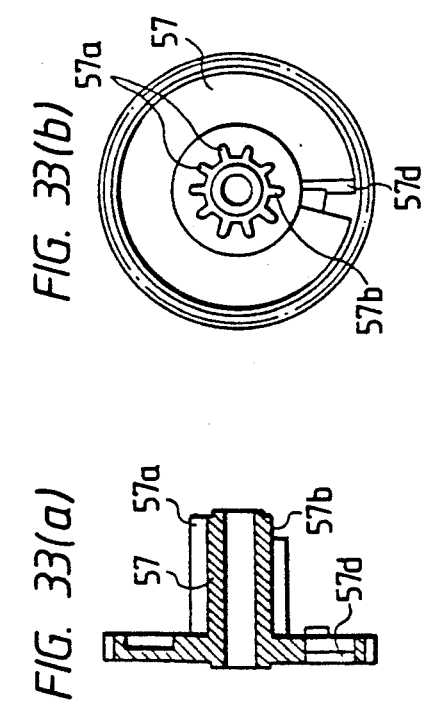
FIG. 32(a)　FIG. 32(b)　FIG. 33(a)　FIG. 33(b)

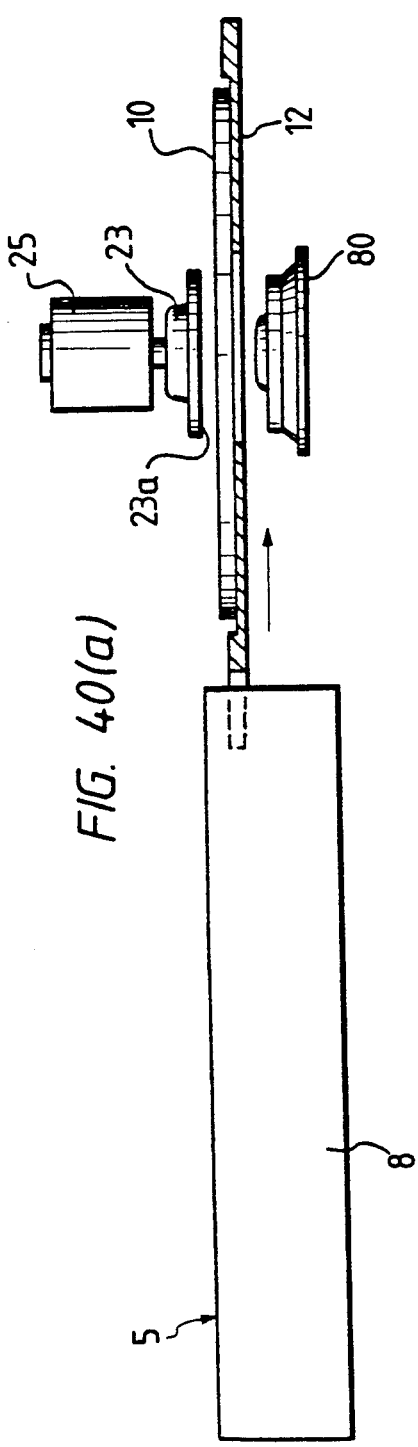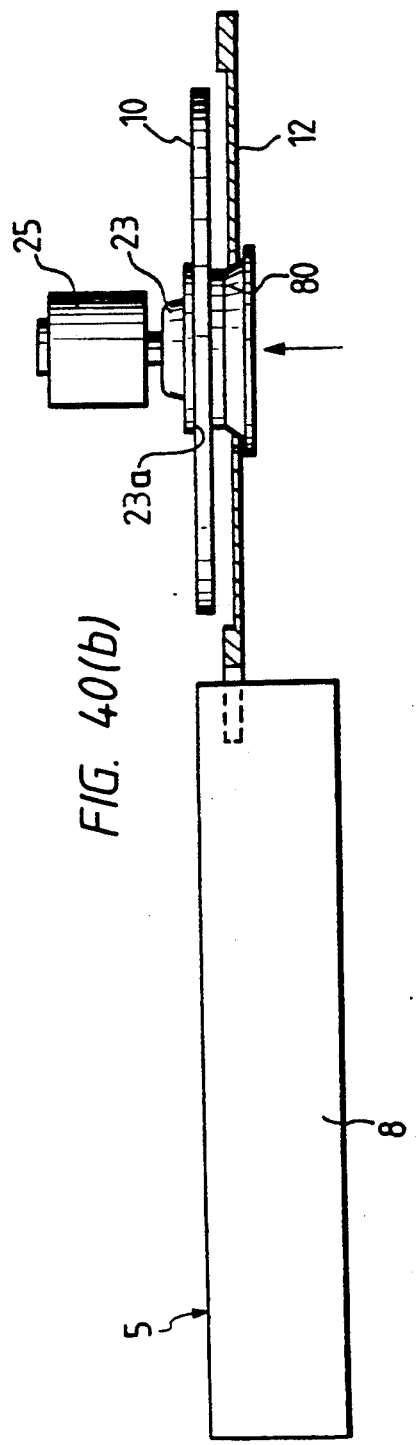

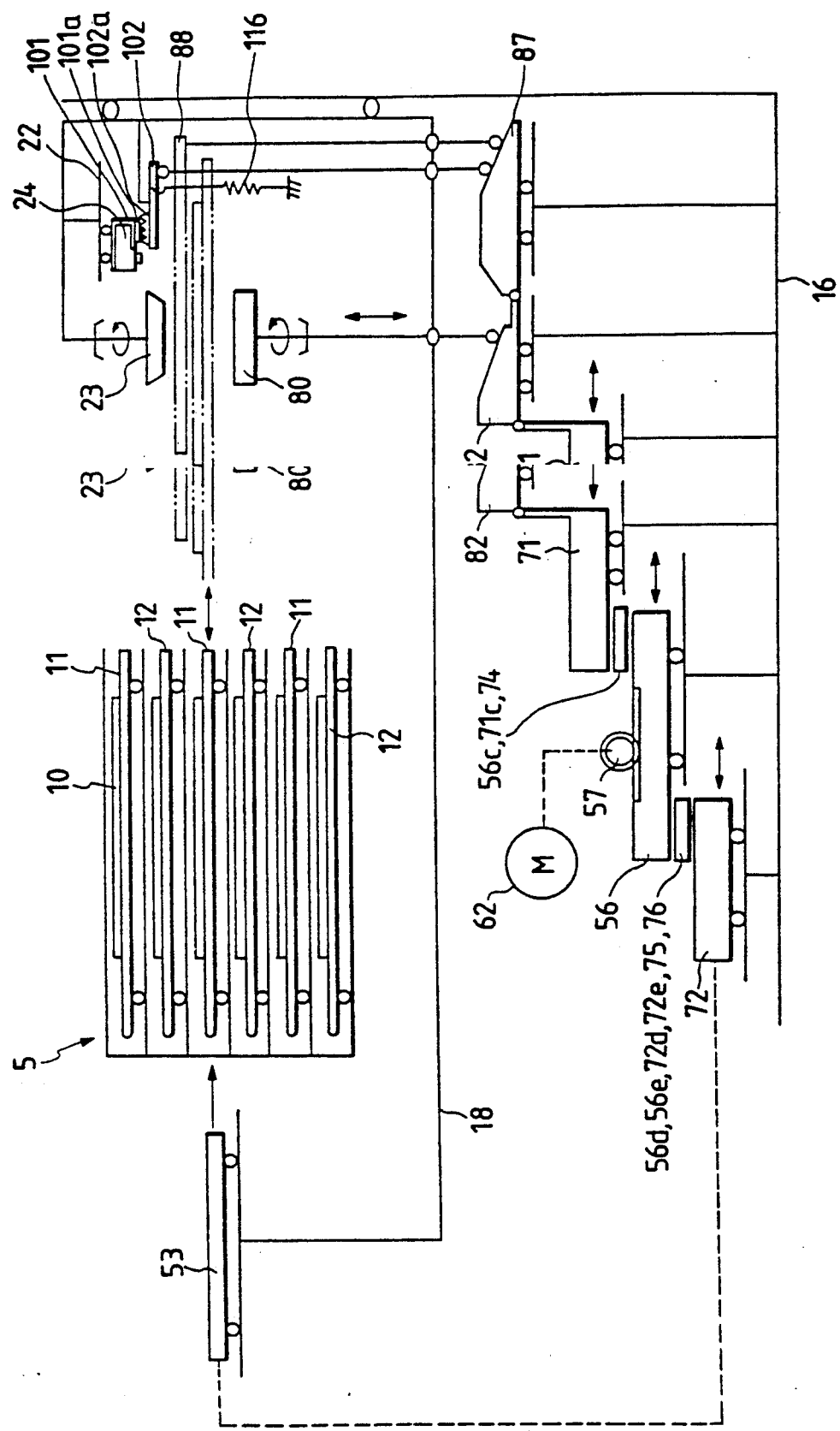

MULTI-DISK PLAYER

BACKGROUND OF THE INVENTION

1. Field of the Invention

The present invention relates to a disk player, and more particularly to a multi-disk player capable of accommodating a plurality of disks and playing back the accommodated disks one after another.

2. Prior Art

Japanese patent Preliminary Publication No. 61-2618853 discloses a multi-disk player which is provided with a playback means including a turntable and a pick up, a magazine as a disk-accommodating chamber in which a plurality of disks may be positioned so that the disks can be taken out selectively and can be detachably loaded into a loading position within the player housing, and a disk extracting-and-carrying mechanism which selects a disk to be played back and carries the disk to a disk-carrying surface of the turntable as well as returns the disk into the magazine upon the completion of its playback.

With such multi-disk players, when carrying the selected disk onto the turntable, the disk is carried by the disk extracting-and-carrying mechanism in two directions perpendicular to each other but parallel to the disk-carrying surface of the turntable. Specifically, the disks are stacked in the magazine in parallel with the disk-carrying surface of the turntable, and either the playback means including the turntable or the magazine is supported on a movable member which is reciprocated in the direction in which the disks are lined up. Thus the disk is moved in effect in the direction perpendicular to the disk-carrying surface of the turntable. The movement of the disk in the direction parallel to the disk-carrying surface of the turntable is effected by simply causing the disk to project from the magazine.

The disk player is provided with a guide/drive means for guiding and causing the pick up to move along the recorded surface of the disk when the disk is rotated.

Conventionally, a disk player for playing back a disk, such as a CD-ROM that requires a high speed movement of the pick up, employs a quickly responding drive means i.e., a linear motor as a drive means for the pick up. However, if a linear motor is used, there is a possibility that the pick up will move freely when the linear motor is not powered on, that is, when the disk is not being played back. Therefore, the pick up may move violently and tend to impinge members around to damage them. Thus, the disk player is provided with a securing means for securing the pick up to the player housing when the disk is not being played back.

SUMMARY OF THE INVENTION

An object of the invention is to provide a multi-disk player which employs a quickly responding drive means as a pick up drive means that improves the time required for the pick up to access the desired information recorded on the disk as well as a low-cost securing means for securing the pick up to the player housing when the disk is not being played back.

A multi-disk player according to the invention is CHARACTERIZED in that the disk-carrying means, which carries the disk in the disk accommodating chamber to the playback means and accommodates the disk in the disk accommodating unit upon completion of the playback operation of the disk, comprises a fastening means for fastening the pick up driven by the quickly responding drive means to the player, and the drive force for moving the disk between the disk accommodating chamber and the playback means is utilized as a drive force for fastening the pick up.

BRIEF DESCRIPTION OF THE DRAWINGS

FIGS. 2a–5b are illustrative diagrams of the magazine loaded into the player housing of the magazine disk player shown in FIG. 1;

FIG. 6 is a top view of the internal construction of the magazine disk player;

FIGS. 9–15 are partial expanded views of the internal construction shown in FIGS. 6–8;

FIG. 16 is a cross-sectional view taken along the line XVI—XVI in FIG. 6;

FIGS. 17a to 37 are partial expanded views of the internal construction shown in FIG. 6;

FIGS. 40a and 40b are illustrative diagrams of the operation for showing the operation of the internal mechanism of the magazine disk player shown in FIGS. 1–37;

FIG. 41 is a schematic diagram of the internal mechanism of the magazine disk player shown in FIGS. 1–37.

DETAILED DESCRIPTION OF PREFERRED EMBODIMENTS

A magazine disk player or multi-disk player according to the present invention will be described with reference to the drawings.

Figure 1:
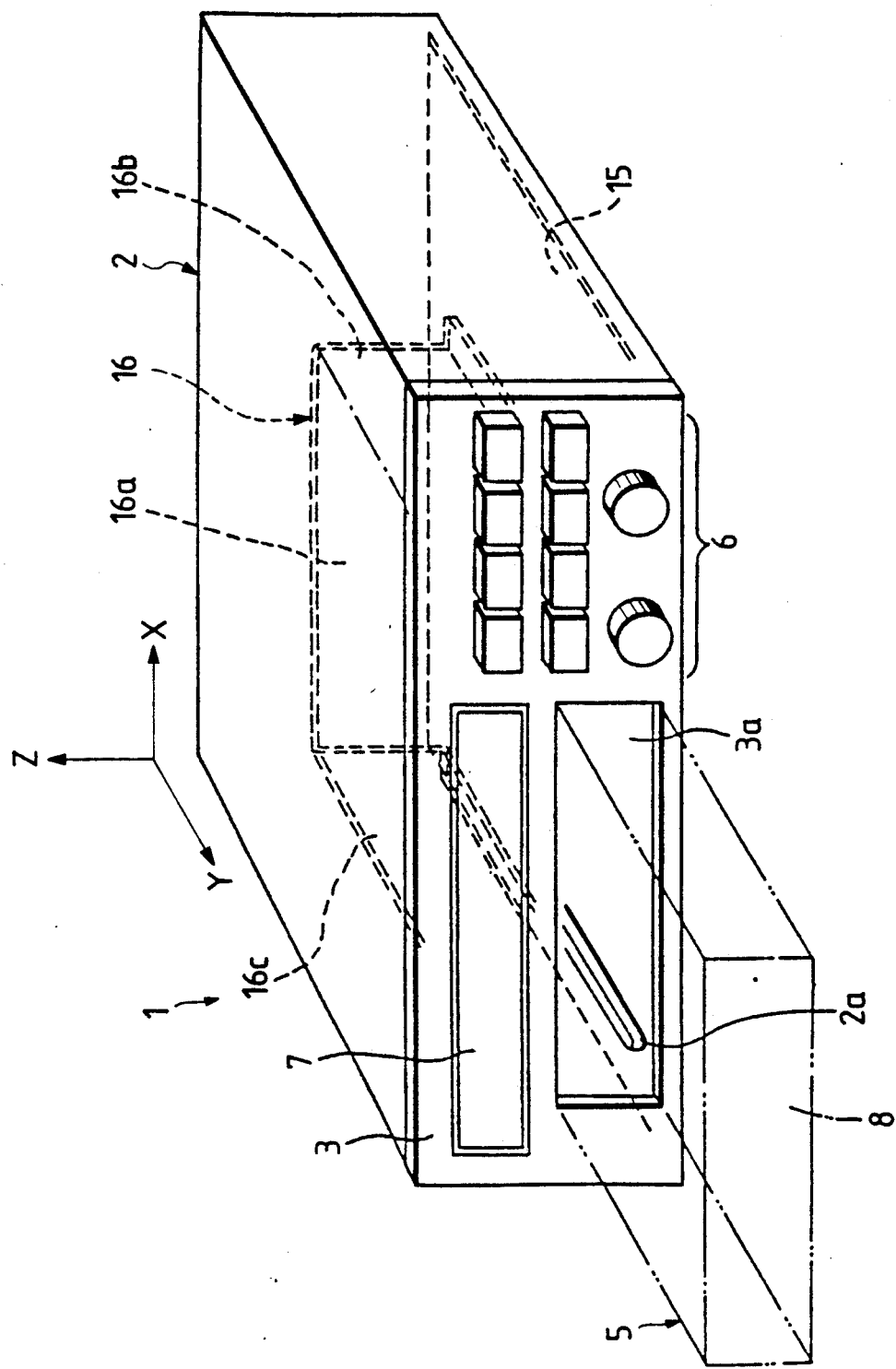
FIG. 1 is a perspective view showing an entire magazine disk player according to the present invention.

In FIG. 1, there is shown, in perspective view, a magazine disk player 1 according to the present invention. A front panel 3 of a player housing 2 is provided with a rectangular opening 3a as a disk accommodating chamber through which a magazine 5 is loaded into the housing 2. The opening 3a extends in the left and right direction, i.e., along the X-axis. An arrow Z represents the upward direction. The front panel 3 is provided with a disk player 7 and an operating unit 6 through which the magazine disk player is operated. As shown in FIGS. 2a–2c, the magazine 5 has a magazine body 8 which is a generally flat rectangular-shaped housing, six rectangular trays A 11 and trays B 12 consisting of two types of rectangular trays, each type of which includes three sheets capable of carrying disks 10 on the main surface thereof. The trays A and B, and therefore the respective disks 10, are lines up in the direction normal to a later described disk-carrying surface of the turntable, i.e., lined up in the vertical direction (Z-axis) in this embodiment.

The trays A 11 and B 12 are provided in such a way that they are rotatable about a rotation-supporting shaft 8a extending in the direction in which the trays are disposed (vertical direction) and located at the left rear end of the magazine body 8. Thus, the trays are projectable relative to the magazine body 8 along the main surfaces thereof.

The magazine 5 will be described in more detail.

Figure 3A:
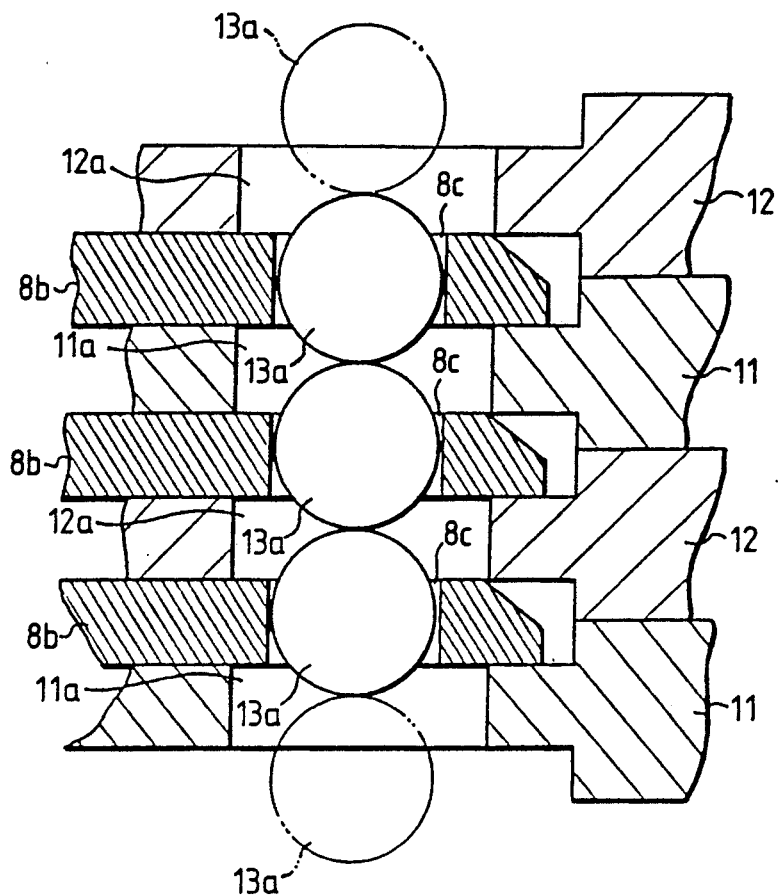

The magazine body 8 is provided with seven partition walls 8b which are disposed in the vertical direction (in the Z-axis). The respective trays are disposed between the partition walls 8b. As shown in FIG. 3a, circular openings 8c are formed near the rotation shaft 8a in the respective partition walls 8b concentrically with each other. FIGS. 4a and 4b and FIGS. 5a and 5b show the detail of the trays A 11 and B 12. As is seen from the figures, openings 11a and 12a are formed in the respective trays in alignment with the openings 8c formed in the respective partition walls 8b.

In this specification, the openings 8c formed in the partition walls are referred to as a first opening and the openings 11a and 12a formed in the trays A 11 and B 12 are referred to as a second opening. Into the openings 8c, 11a, and 12a are inserted five sphere-shaped movable members 13a which can move in the direction where the respective partition walls 8b are disposed (in the Z-axis). The diameter of the respective movable members is the same as the pitch with which the respective trays 11 and 12 are alternately disposed. The respective movable members are urged by a pair of leaf springs 13b disposed at upper and lower ends of the magazine body 8 so that the members tend to approach each other.

As shown in FIG. 2b, at the right front end of the magazine body 8, there is provided a press lever 14 generally extending in the back-and-forth direction (in Y-axis), and one end of the press lever 14 is pivotally mounted to the magazine body 8 by means of a pin 14a. The pin 14a extends in the vertical direction (Z-axis). The other end of the press lever 14 is adapted to smoothly engage the free end of the respective trays 11 and 12. The spring 14b engages the press lever 14. The spring 14b urges the press lever 14 in the counterclockwise direction in FIG. 2b, thereby giving a tray-depressing force to the press lever 14. The press lever 14 has formed thereon a projection 14c, which is adapted to abut the edge 3b of the opening 3a of the player housing when the magazine 5 is moved from its loaded position in the player housing 2. The projection 14c abuts the edge 3b of the opening 3a for causing the press lever 14 to pivot to urge the respective trays 11 and 12 toward the position where they are accommodated in the magazine body 8.

The press lever 14 and the spring 14b form an urging means for urging the respective trays 11 and 12 together with the disks 10 supported by the respective trays toward the location where they are accommodated. A holding mechanism, which holds the respective trays 11 and 12 at their accommodation position, is formed of the urging means, the opening 8c (first opening) formed in the respective partition walls of the magazine body 8, the openings 11a and 12a (second openings) each formed in the respective trays 11 and 12, the respective sphere-shaped movable member 13a, and the leaf springs 13b.

As is apparent from FIGS. 4a–4b and FIGS. 5a–5b, the trays A 11 and B 12 are of substantially the same shape and they only differ in that latches 11b and 12b, which the user grabs with his finger when taking out the respective tray from the magazine body 8, are of different shape and are located at different positions, respectively. On the free ends of the respective trays 11 and 12, there are formed cutouts 11c and 12c, which the previously described press lever 14 engages, and a pair of jig-inserting holes 11d, 11e and 12d, 12e.

On the main surfaces of the adjacent trays that face the disk carrying surface of the respective trays 11 and 12 are provided soft members 11f and 12f formed of, for example, synthetic leather to project further than the main surface. The respective trays 11 and 12 are provided with arcuate recesses 11h, 11i, 12h, and 12i which extend along the moving contour of the soft members 11f and 12f provided in the adjacent trays.

As shown in FIG. 2c, at the middle of the right side of the magazine 5 there is provided an engaging latch 5a which is mounted, pivotable within a predetermined range, at its one end to the magazine body 8. At the right front end of the magazine 5 is provided another engaging latch 5c by means of a pin 5d, pivotable within a predetermined range. The free end of the engaging latch 5c is biased outwardly by the coil spring 5e. These latches 5a and 5c are adapted to engage at their free ends the opening 3a (refer to FIG. 1 and FIG. 2b).

The latches 5a and 5c and the coil spring 5e form a loading inhibiting means which does not allow the loading of the magazine when the magazine 5 is not positioned correctly relative to the loading location in the player housing 2. In other words, when the magazine 5 is to be loaded with its position up side down, the latch 5a pivots due to its own weight to project outwardly of the magazine 5, thereby the free end of the latch 5a engages the (previously described) edge 3b of the opening 3a to inhibit the loading of the magazine 5. Further, when the magazine 5 is to be loaded with the front and rear sides thereof being reversed, the latch 5c which is projected outwardly by the coil spring 5e engages the edge 3b of the opening 3a to inhibit the loading of the magazine 5.

Figure 3B:
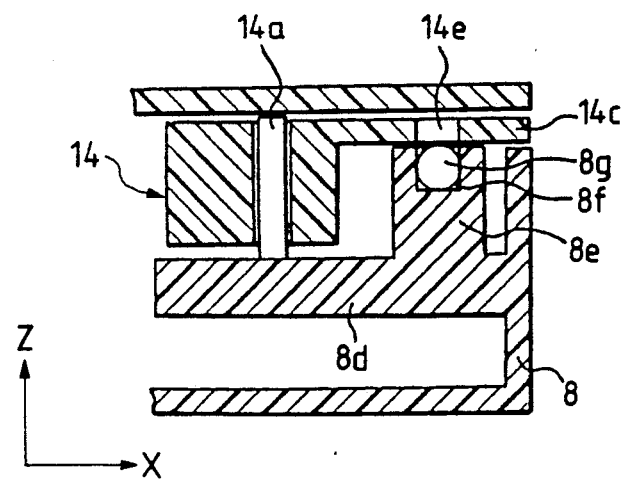
Figure 4A:
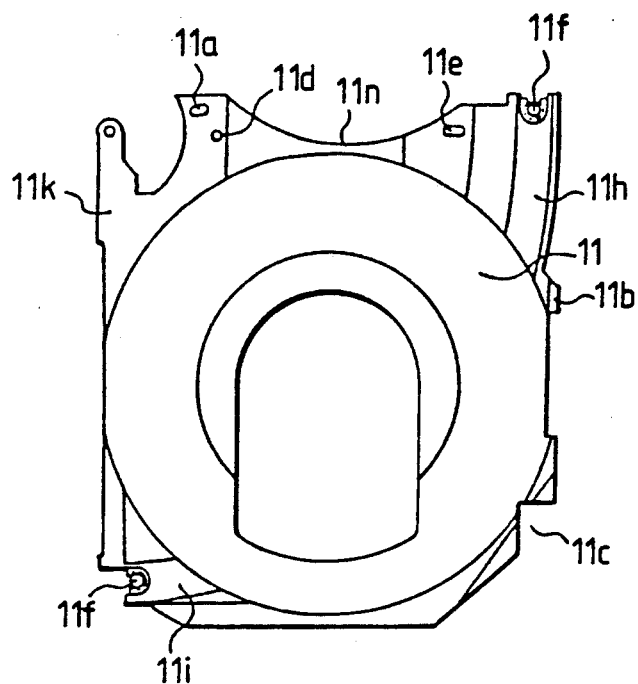
Figure 4B:
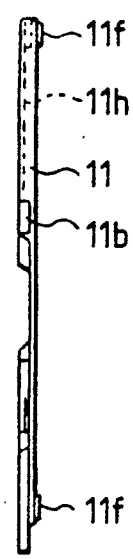
Figure 5A:
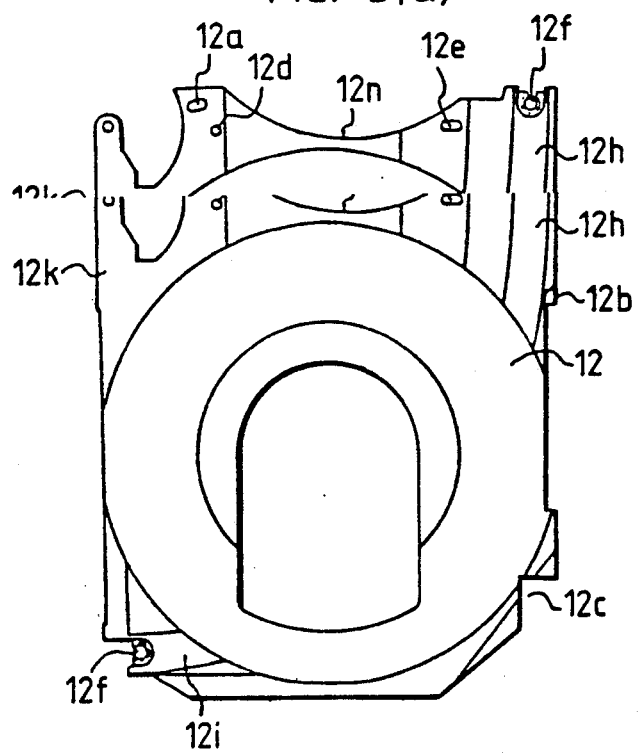
Figure 5B:
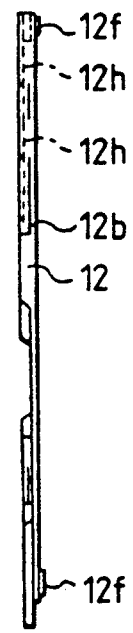

As shown in FIG. 2b and FIG. 3b, a circular opening 14e is formed in the projection 14c of the press lever 14 which is pivotally mounted to the magazine 5. As shown in FIG. 3b, to the magazine body 8 that serves as a housing for the magazine 5 is formed an abutment 8d along the under surface of the press lever 14. On the top surface of the abutment is formed a boss 8e which has a recess 8f on the upper end thereof and sphere-like movable member 8g are inserted movably in the vertical direction (Z-axis). The opening 14e formed in the projection 14c of the press lever 14 can oppose the recess 8f when the press lever 14 is at a location shown in FIG. 2b, while the part of the sphere-like movable member 8g can be inserted into the opening 14e.

The press lever 14 and the movable member 8g form a projection-inhibiting means which restrains the projection of the respective trays 11 and 12 from the magazine body 8 when the magazine 5 or disk holder is positioned up side down. That is, when the magazine 5 is positioned up side down, the sphere-like movable member 8g drops due to its own weight so that the part of the movable member falls in the opening 14e of the press lever to limit the pivotal movement of the press lever 14. Thus, the projection of the respective trays 11 and 12 outwardly of the magazine body 8 may be prevented.

As shown in FIG. 1, to the bottom plate 15 fixed within the housing 2, there is mounted a chassis 16 which serves as a supporting member. The chassis 16 comprises a flat top 16a that spreads in the X-Y plane and a pair of side walls 16b and 16c that stand vertically on both left and right edges of the flat top 16a.

Figure 7:
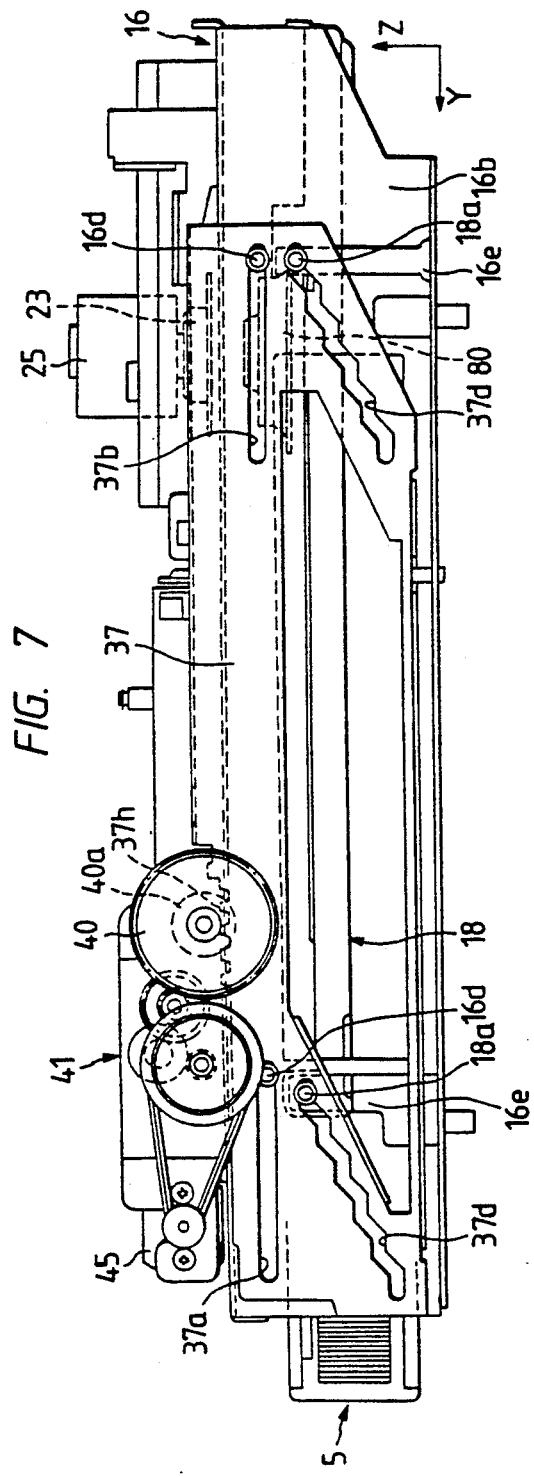
FIGS. 7 and 8 are views taken along the lines VII—VII and VIII—VIII, respectively.
Figure 8:
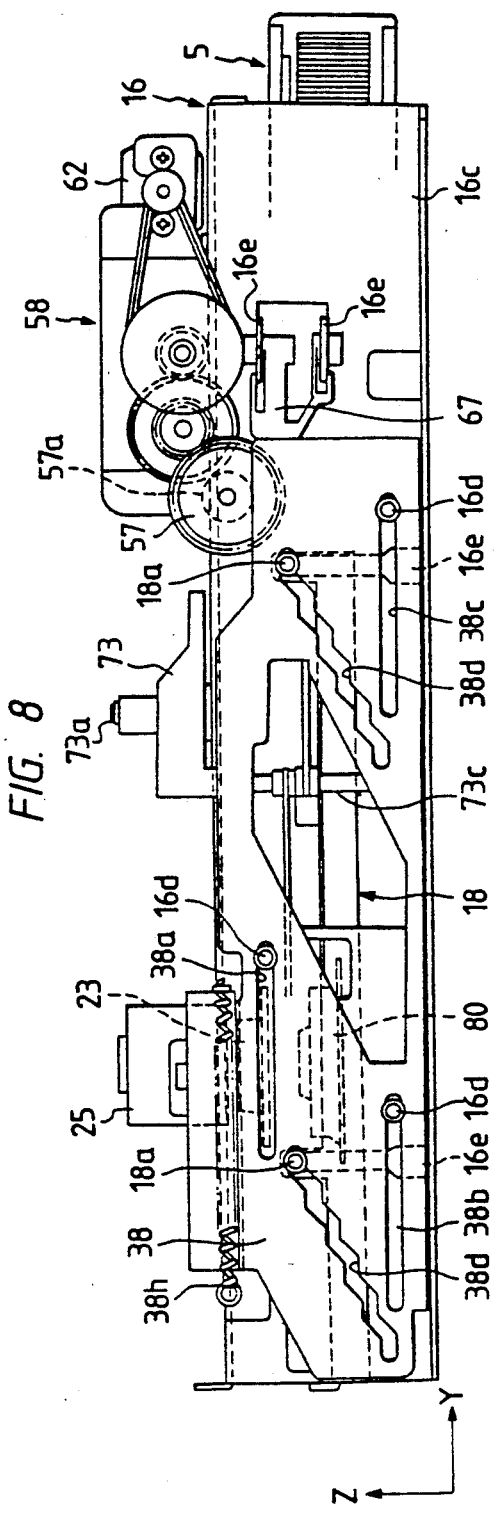
Figure 9:
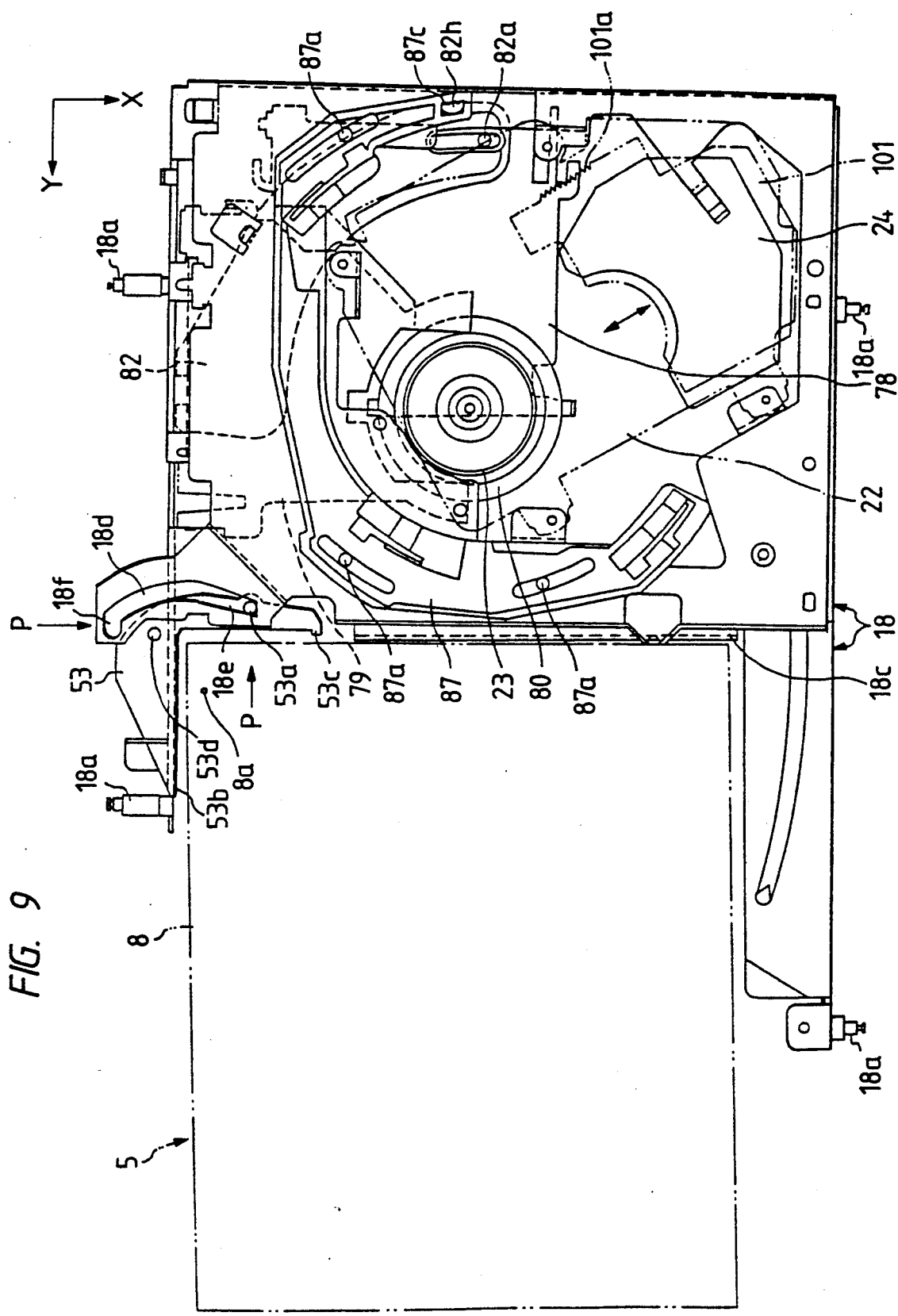

As shown in FIGS. 6–9, between the rear ends of the pair of side walls 16b and 16c of the chassis 16 is disposed a moving member 18 as a carrying member which is mounted to be movable in the vertical direction (Z-axis) or the direction in which the respective trays 11 and 12 are disposed. As shown in FIGS. 6 and 9, on the top surface of the moving member 18 is mounted a carrying plate 22 as a holding member on which a turntable 23 is mounted as shown in FIGS. 8 and 10. As shown in FIG. 9, the carrying plate 22 carries a carriage 24 which supports an optical pick up means and is movable in a plane including a disk carrying surface 23a (shown in FIG. 10), i.e., in the direction of left and right (X-axis). The turntable 23 is driven directly by a spindle motor 25 shown in FIGS. 7–10. On the carrying plate 22 is provided a later described quickly-responding drive means or linear motor for driving the carriage 24.

A disk-playing means for playing back the disk is formed of the aforementioned turntable 23 and spindle motor 25, the carriage 24 including an optical pick up means, and the aforementioned linear motor. That is, the disk-playing means is carried by the moving member 18, which is part of the disk-playing means, and is moved in the vertical direction (Z-axis).

As shown in FIG. 10, to the turntable there is mounted a magnet 23b which gives a clamping force to a disk-shaped press member of a later described clamp mechanism. The carrying plate 22 for holding the spindle motor 25 and the turntable 23 is made of magnetic material, and as shown in FIG. 10, is positioned at a side opposite to the disk-carrying surface of the turntable 23. Therefore, the turntable 23 is attracted by the magnetic force of the magnet 23b toward the carrying plate 22, thereby closely securing both the output shaft 25a of the spindle motor 25 and the bearing (not shown) for supporting them to each other.

Figure 12:
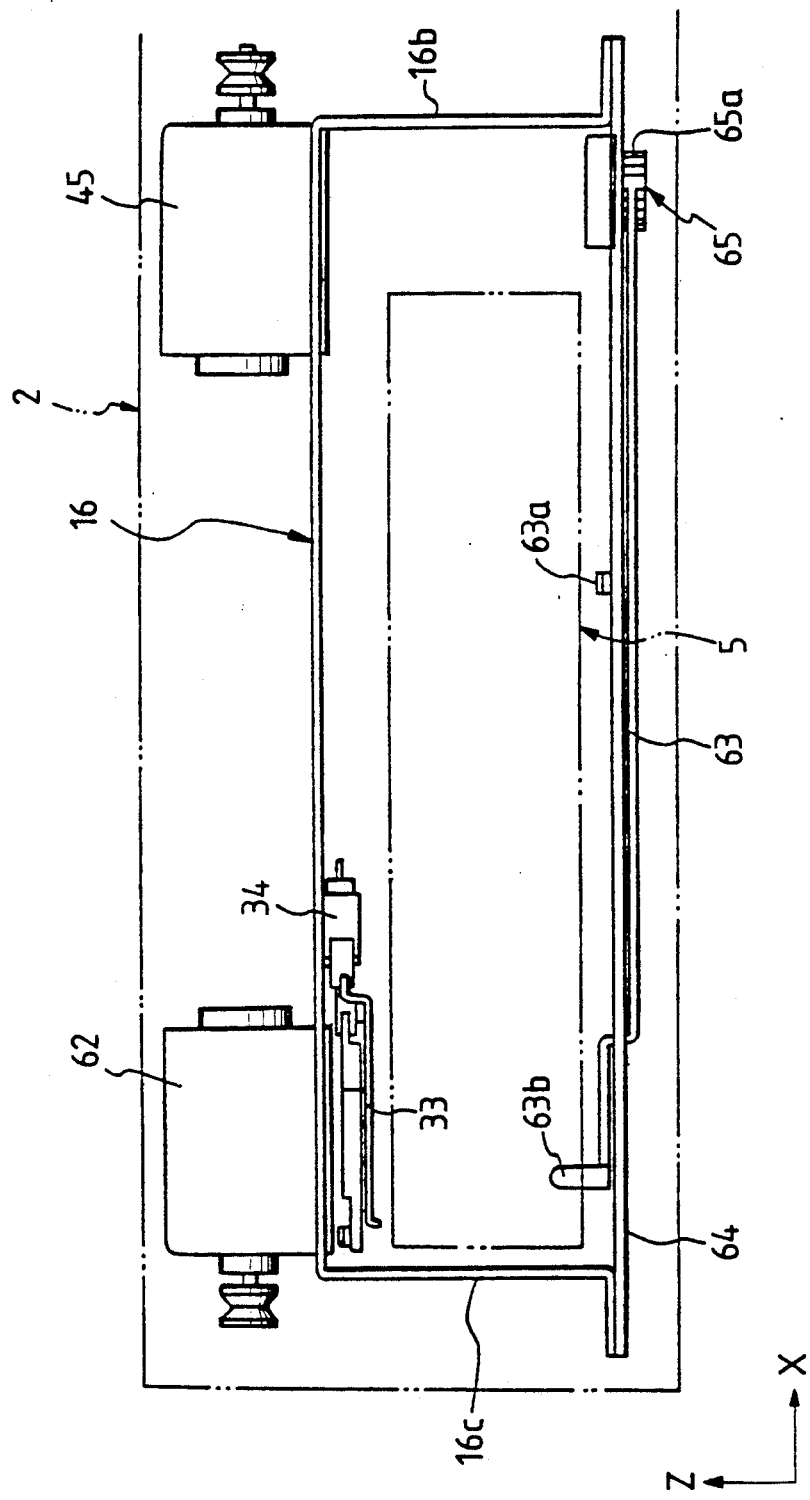

As shown in FIGS. 11 and 12, on the underside of the chassis 16 is mounted a moving lever 33 made of steel plate such that the lever 33 is movable in the direction of back and forth (Y-axis). FIGS. 13a and 13b illustrate the detail of the moving lever 33.

As is apparent from FIGS. 13a and 13b, at the end of the moving lever 33, there is provided a projection 33a which projects downwardly to engage the rear end of the magazine 5. In other words, when the end of the magazine 5 engages the projection 33a, the moving lever 33 is moved rearwardly. To the moving lever 33 is connected a coil spring not shown for exerting a bias force in the direction forward to the moving lever (Y-direction).

As shown in FIGS. 6 and 11, on the left side of the moving lever 33 is disposed a pair of detection switches 34 and 35 so that the projections 33b and 33c of the moving lever that moves back and forth engage the actuators of these detection switches 33b and 33c to operate the actuators thereof.

The aforementioned moving lever 33 and the detection switches 34 and 35 form a magazine-loading detection means which detects that the magazine 5 is loaded in the magazine loader in the player housing 2.

The moving-member moving means, which will cause the aforementioned moving member 18 to move vertically (Z-axis), will now be described.

Figure 14:
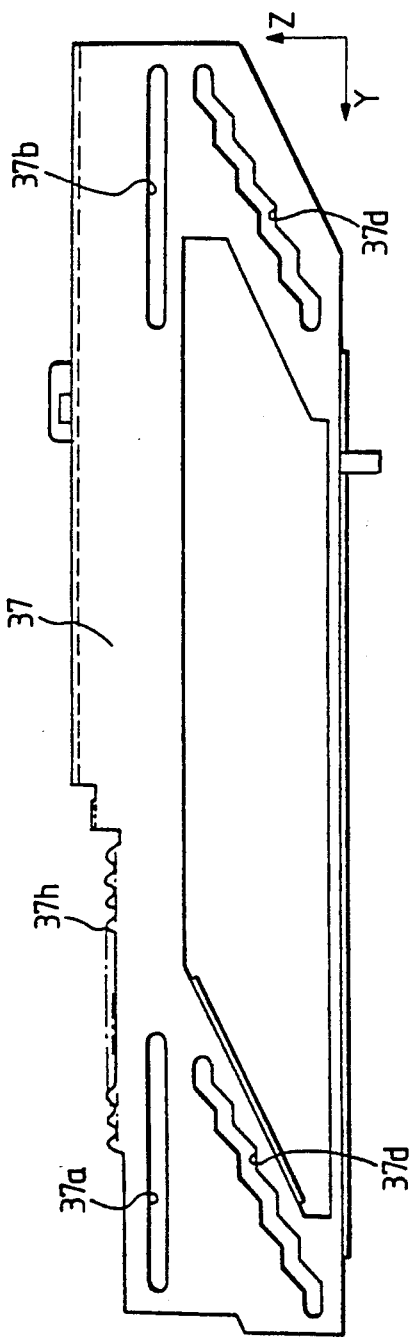
Figure 15:
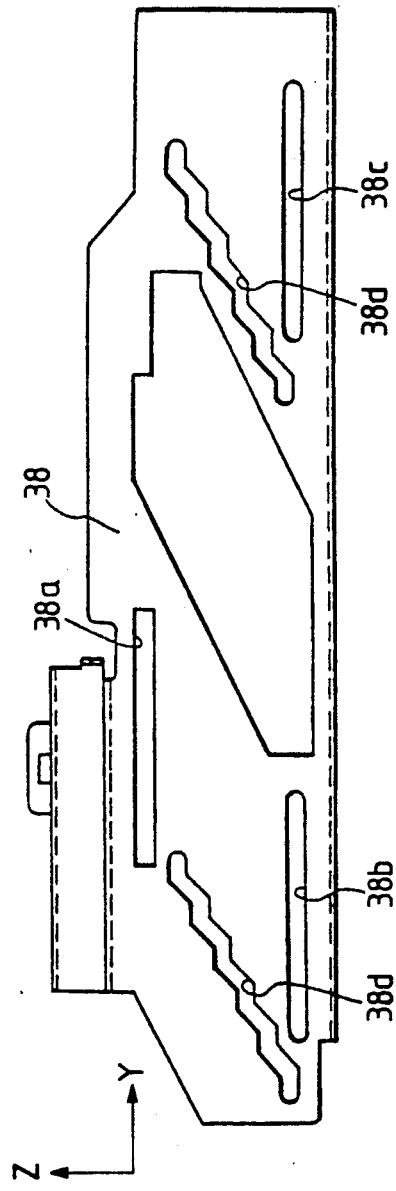

As shown in FIGS. 6–8, on the outer surface of the side walls 16b and 16c that stand to the left and right of the chassis 16, there is provided a pair of elongate longitudinally-movable plates 37 and 38 that extend back and forth in their longitudinal direction. The detail of the longitudinally-movable plates 37 and 38 is shown in FIGS. 14 and 15. As is particularly apparent from FIGS. 7 and 8, the respective longitudinally movable plates 37 and 38 are formed with guide slots 37a, 37b, 38a, 38b, and 38c that extend in the longitudinal direction of the respective movable plates. The respective movable plates 37 and 38 are mounted to the chassis 16, which supports the plates 37 and 38, through the respective guide slots through which pins 16d projects outwardly of the side walls 16b and 16c. That is, the movable plates 37 and 38 can reciprocate back and forth.

As shown in FIGS. 6–9, the moving member 18 is provided with a total of four pins 18a, two of which project on the left side and the rest on the right side of the moving member 18. As shown in FIGS. 7 and 8, each of these pins loosely movably engages each of four guide slots 16e that are formed in the vertical direction in the left and right side walls 16b and 16c of the chassis 16, thereby guiding the moving member 18 in the vertical direction.

The pins 18a project outwardly on the left and right sides of the moving member 18 through the guide slots 16e of the chassis 16, and movably engage cam holes 37d and 38d of a stair case shape which are formed in the movable plates 37 and 38. The cam holes 37d formed in the moving plate 37 extend generally downwardly in the forward direction (direction of arrow Y). The cam holes 38d formed in the moving plate 38 extend generally downwardly in the rearward direction (direction opposite of arrow Y). In other words, the respective cam holes 37d and 38d are formed such that the moving member 18 moves vertically when the movable plates 37 and 38 move relative to each other. As shown in FIGS. 6 and 8, at the rear end of the movable plate 38 there is coupled a coil spring 38h which urges the movable plate at all times rearwardly (in the direction opposite to the arrow Y). Therefore, the gap between the cam hole 38d formed in the movable plates 38 and the pin 18a that engages the cam hole 38d is always zero permitting the precise vertical movement of the movable plate 18.

As shown in FIGS. 6, 7, and 14, a rack 37h is formed at the front end of the left side movable plate 37 in the longitudinal direction of the movable plate. As is apparent from FIGS. 6 and 7, this rack 37h meshes with a pinion 40a of a double gear 40 which is of an integral construction of a large gear and a small gear provided on the chassis 16. The movable plate 37 is driven by a motor 45 through a gear speed reduction mechanism 41 including the double gear 40.

As shown in FIG. 6, between the left and right movable plates 37 and 38 is disposed a lever 47 which is mounted to the chassis 16 such that the lever 47 is guided by a pin 16g projected on the chassis 16 to rotate about a phantom center 47a. Both ends of the lever 47 are pivotally connected to the left and right movable plates 37 and 38 so that when the movable plate 37 is driven, the movable plate 38 is also driven in synchronism with the movable plate 37.

The aforementioned motor 45, the gear speed reduction mechanism 41, the lever 47, and small members associated with these form a drive mechanism for providing the movable plates 37 and 38 with a drive force to cause the moving member 18, which carries the playback means, to move. The drive mechanism causes the moving member 18 to move in accordance with a movement instruction outputted from a control unit which will be described later.

As shown in FIG. 6, on the top of the left vertical side wall 16b of the chassis 16 there is provided a detection switch 49. The switch 49 is for detecting that the movable plate 37 is in its most forward position, and is operated when the part of the movable plate 37 engages the actuator of the switch. To the front right side of the movable plate 37 there is provided an address plate 50 which has six slits 50a aligned in the direction of movement of the movable plate 37. At the rear of the detection switch 49 there is provided a photo sensor 51 for detecting each of the slits 50a in the address plate. In the specification, the detection switch 49 is referred to as a first sensor and the photo sensor as a second sensor. The slit detection signal from the second sensor is supplied to a counter not shown that counts the slit detection signal. A later described control unit which performs the control of the operation of the magazine disk player is positioned in place within the player housing 2. The control unit detects the stop position of the movable plate 37 in terms of the counts of the aforementioned counter.

When a movement instruction is to be issued to the aforementioned drive mechanism while the photo sensor 51 or the second sensor is issuing a slit detection signal, the aforementioned control unit continues to issue the movement instruction until the present position of the moving member 18 coincides with the specified position corresponding to the disk specified by the playback instruction. When the movement instruction is to be issued to the aforementioned drive mechanism while the photo sensor 51 is not issuing a slit detection signal, the control unit continues to issue the movement instruction until the detection signal from the detection switch 49 or the first sensor is supplied and thereafter issues the movement instruction in such a way that the aforementioned specified position and the present position of the moving member 18 coincide.

As shown in FIG. 9, at the front right side of the moving member 18 there is provided a tray engagement member 53 for engaging each of the respective trays 11 and 12 in the magazine 5 to cause the respective trays to project outwardly of the magazine body 8. The tray engagement member 53 is generally L-shaped and is guided by a pin 53a projected on the tray engagement member which slidably engages an arcuate guide grooves formed in the moving member 18. In other words, the tray engagement member 53 rotates about the center of the arcuate guide grooves 18d so that the rotational ends 53b and 53c of the tray engagement member 53 push the trays 11 and 12 to cause the trays to project into the magazine body 8 to be accommodated therein. As is apparent from FIG. 9, the rotating axis (the center of the arcuate guide groove 18d) of the tray engagement member 53 is aligned with a rotational axis 8a of the respective trays 11 and 12. The respective trays 11 and 12 are pushed at the respective positions 11k and 12k (see FIGS. 4–5) near the rotational shaft 8a by the tray engagement member 53 to cause them to project outwardly of the magazine body 8. As shown in FIG. 9, the leading end 18e and trailing end 18f of the arcuate guide groove 18d extend substantially at right angles with respect to a drive force P exerted on the tray engagement member 53 by a tray engagement member driving means, which will be described later.

The tray engagement member driving means, which drives the tray engagement member 53 into rotation to cause it to project from the magazine body 8, will now be described.

As shown in FIG. 6 and 16, on the underside of the right side wall of the chassis 16, there is positioned a moving member 56 that extends in the direction of back and forth and is mounted to the chassis 16 movably in the longitudinal direction. FIGS. 17a–17d show the detail of the moving member 56. To the right front end of the moving member 56 is formed a rack 56a in the direction in which the moving member 56 extends. The rack 56a meshes with a pinion 57a of a double gear 57 (refer to FIGS. 6 and 8) provided on the chassis 16. The moving member 56 is driven by a motor 62 through a gear speed reduction mechanism 58 including the double gear 57. The gear speed reduction mechanism 58 and the motor 62 form a driving-force exerting means which exerts the driving force on the moving member 56.

As shown in FIGS. 12 and 18, near the extreme back end of the magazine loading space of the player housing 2 is disposed a pivot lever 63 which causes the magazine 2 loaded in the magazine loading space to project outwardly of the magazine loading space. The pivot lever 63 extends substantially in the direction of left and right and is mounted, by means of a pin 63a about which the pivot lever 63 may be pivotable, to substantially the center of a subchassis 64 provided under the chassis 16. The pin 63a extends vertically (Z-axis). As is apparent from the figure, at the right end of the pivot lever 63 is provided a projection 63b at which the pivot lever 63 abuts the rear end of the magazine 5. Also, at the left end of the pivot lever 63 is formed a gear 63c having the center thereof at the pin 63a with which a braking gear 65a of the damper 65 meshes (shown in FIG. 12). The damper 65 is for providing a braking force by virtue of the viscosity of a viscous material such as grease received in the damper 65. As shown in FIG. 18, the pivot lever 63 is given a force for ejecting the magazine by a coil spring 63d.

The aforementioned pivot lever 63, the damper 65, and the coil spring 63d form a projection means for causing the magazine 5 to project outwardly of the magazine loading space within the player housing 2.

As shown in FIG. 8, to the vertical side wall 16c, there is pivotally provided a lock member 67 which locks the magazine to the player housing 2 at the loading position by engaging at one end thereof an engagement recess 5g of the magazine 5 (refer to FIGS. 2b and 2c). The magazine 5 locked by the lock member is released by forward movement of the aforementioned moving member 56.

As shown in FIGS. 6 and 16, to the right end of the chassis 16 are positioned a first lever member 71 and a second lever member 72 and are mounted to the chassis 16 so that the levers 71 and 72 can reciprocate in the longitudinal direction of the chassis. FIGS. 19a–19b and FIGS. 20a–20b show the details of the first lever 71 and the second lever 72, respectively. The first lever 71 is for driving a support which is part of a later described clamp mechanism, and the second lever 72 is for driving the aforementioned tray engagement member 53 (refer to FIG. 9) into rotation through an intermediate lever 73 (refer to FIGS. 6 and 9). The chassis 16 is provided with the intermediate lever 73 rotatable with respect thereto by means of a vertically extending pin 73a and is driven into rotation by a pin 72a which projects from the second lever 72 to engage the cam groove 73b. To the other end of the intermediate lever 73 is provided a downwardly extending rod 73c which is inserted into a hole 53d formed in the tray engagement member 53 (shown in FIG. 9) to be driven into rotation by the tray engagement member 53. As shown in FIG. 6, the intermediate lever 73 is provided with a leaf spring 73e for urging the pin 72a to closely contact with the cam groove 73b.

The aforementioned cam groove 73b is adapted to separate the tray engagement member 53 from the respective trays after the tray engagement member 53 pushes the trays A 11 and trays B 12 to accommodate them in the magazine body 8.

The aforementioned first lever member 71 and the second lever member 73 are both moved by the aforementioned moving member 56.

As shown in FIGS. 6, 16, 17a, and 17c, a first recess 56c is formed at a predetermined position of the moving member 56. While, as shown in FIG. 6 and FIG. 16, in the first lever member 71 there is formed a first opening 71c which is adapted to be in alignment with the first recess 56c, and within the first opening 71c is received a movable body 74 that is adapted to engage the first recess 56c. The first recess 56c, the first opening 71c, and the movable body 74 form a lock/unlock means which properly locks the first lever member 71 to the moving member 56 or unlocks the same. In other words, the first lever member 71 moves or stops together with the moving member in accordance with the distance which the moving member 56 travels to thereby drive a later described clamp mechanism. This lock/unlock means is described in detail in Japanese Patent Preliminary Publication No. 59-29309.

As shown in FIG. 6, FIG. 16, FIGS. 17a and 17c, in the moving member 56 there are formed a second and a third recess 56d and 56e in addition to the first recess, whereas in the second lever member 72 there are formed a second opening 72d and a third opening 72e, which are adapted to be in alignment with the second and third recesses 72d and 72e, respectively. Two movable bodies 75 and 76 are interposed between the second recess 56d and the third recess 56e and between the second opening 72d and the third opening 72e. The second and third recesses 56d and 56e, the second and third openings 72d and 72e, and the movable bodies 75 and 76 form a lock/unlock means which properly locks the second lever member 72 to or unlocks the same from the moving member in accordance with the movement of the moving member 56. In other words, the second lever member 72 moves or stops together with the moving member in accordance with the distance which the moving member moves to thereby drive the tray engagement member 53 (refer to FIG. 9). This lock/unlock means is described in detail in Japanese Patent Preliminary Publication No. 60-72908.

The aforementioned lock/unlock means, the second lever member 72, the moving member 56, and the drive force adding means that exerts a drive force on the moving member 56 and includes the motor 62, form a tray engagement drive means which drives the tray engagement member 53 (shown in FIG. 9) into rotation so that the trays 11 and 12 (FIGS. 4 and 5) project toward the magazine body 8. In other words, the tray engagement member driving means functions as a disk moving means for causing the disk to move between the playback means, including primarily the turntable, and the magazine 5, which is an accommodating chamber. Also, a tray projection means causes the trays 11 and 12 to project from the magazine body 8 and is formed by the tray engagement member drive means, the chassis 16 as a supporting member, the moving member 18, the tray engagement member 53, and the moving plates 37 and 38 etc.

As shown in FIGS. 9, 21-23, on the moving member 18 there is provided a pair of plate-like supports 78 and 79, the support 78 extending in the direction of back and forth (Y-axis) and the support 79 in the direction of left and right (X-axis). The supports 78 and 79 are mounted to the bracket 18f formed on the moving member 18 such that the supports can pivot in a plane substantially perpendicular to the disk carrying surface 23a (shown in FIG. 10) of the turntable 23 (FIGS. 8 and 10 etc.) by means of pins 78a and 79a as a supporting shaft.

Figure 24:
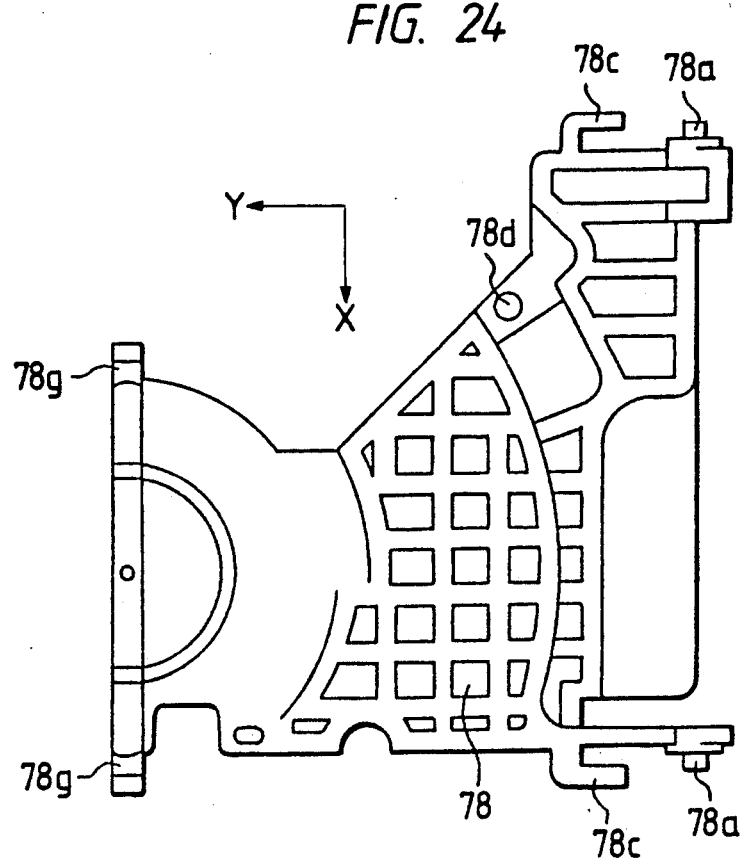
Figure 25:
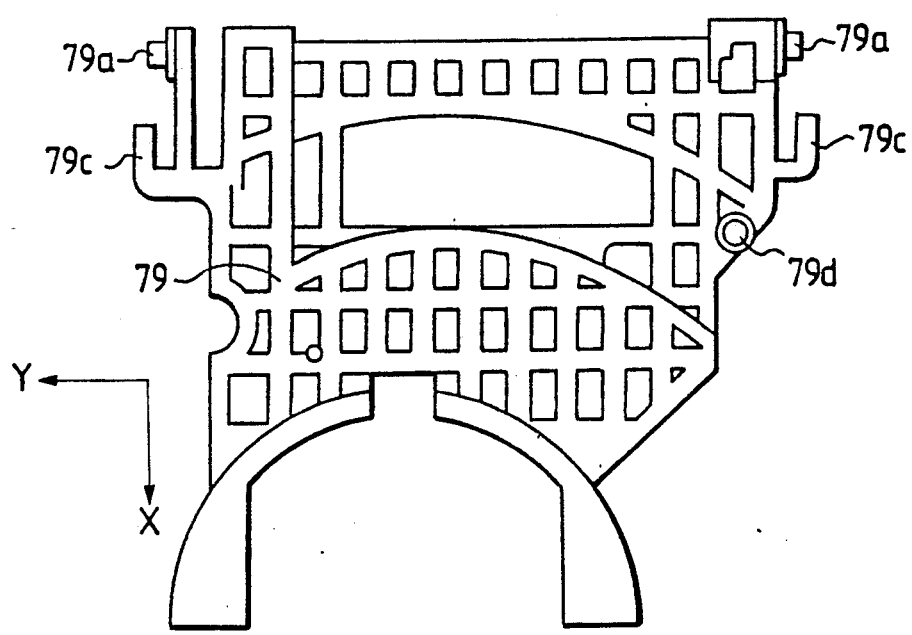

FIGS. 24 and 25 show the details of the respective supports 78 and 79. At the free ends of the supports 78 and 79 there is provided a circular depressing member 80 that abuts the surface of the disk 10 opposite to the surface in contact with the turntable 23 to cooperate with the turntable for disk-clamping action.

In detail, the free end of the support 78 abuts the disk-depressing surface of a flange 81a formed in the depressing member 80, and the free end of the support 79 abuts the surface opposite to the disk-depressing surface of the flange 81a so that the depressing member 80 is vertically sandwiched by both the free ends of supports 78 and 79.

Figure 21:
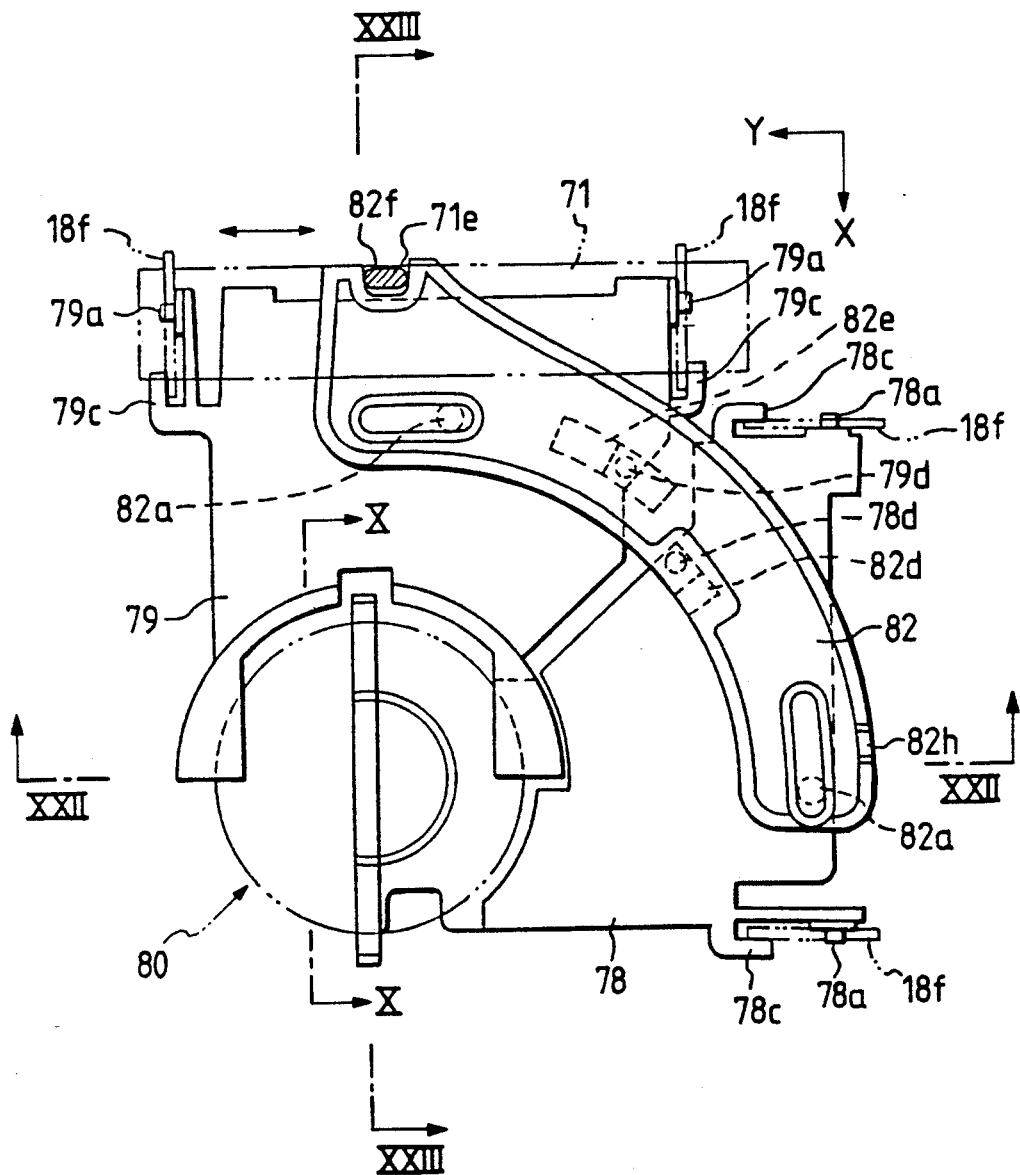
Figure 22:
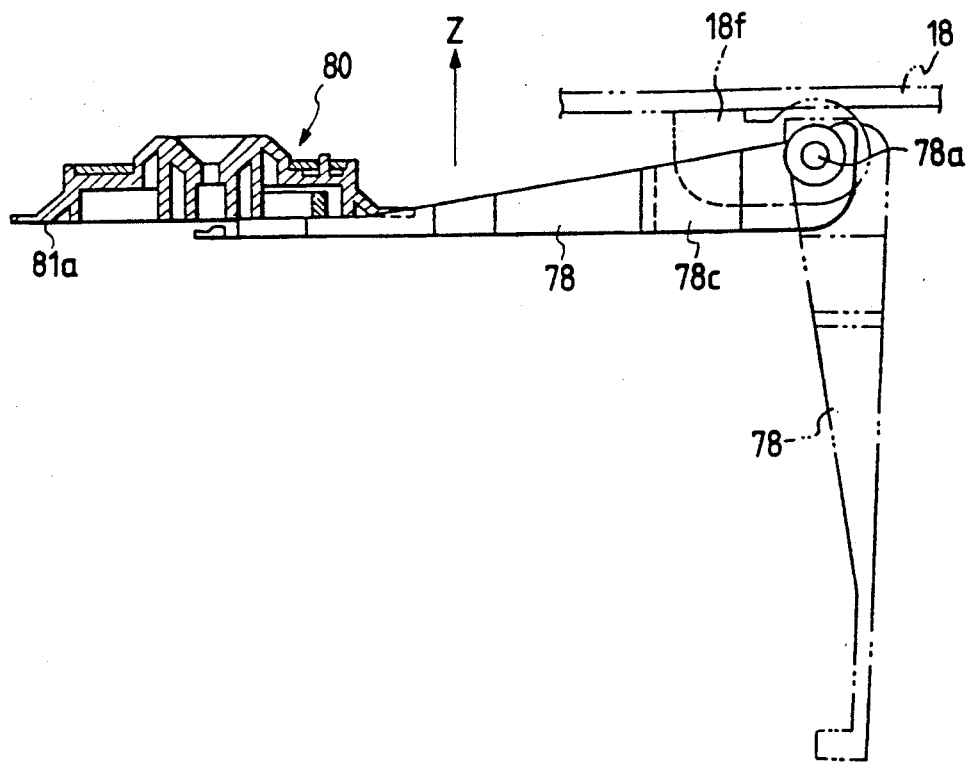
Figure 23:
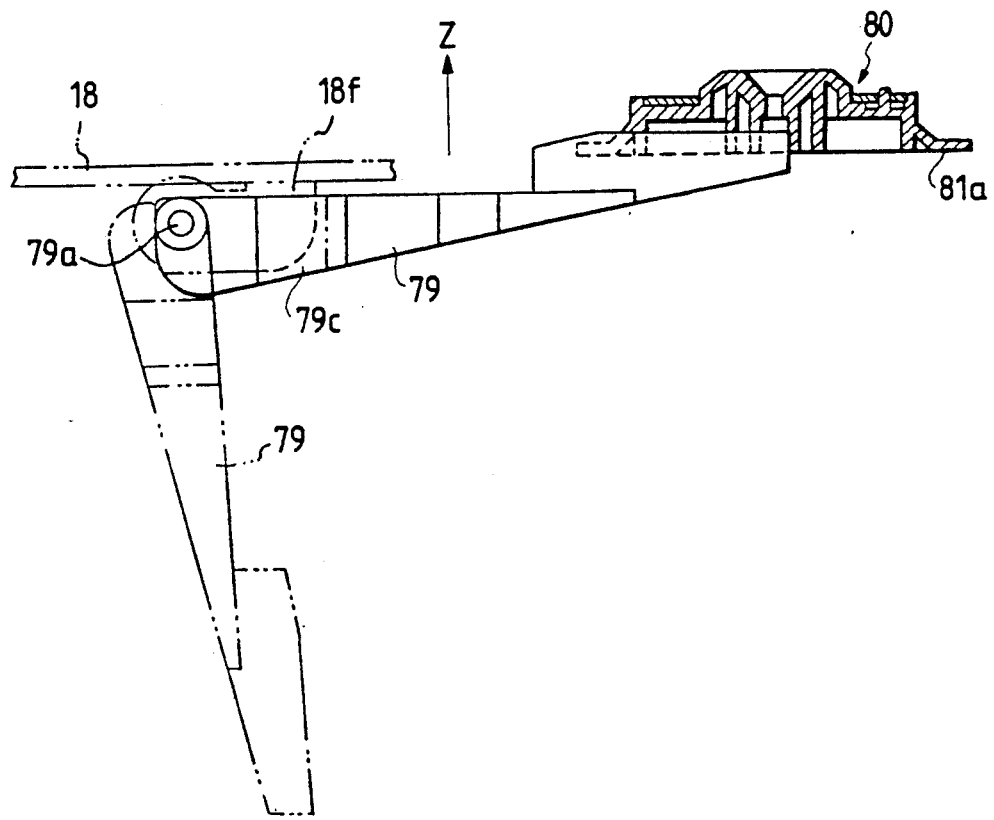

As shown in FIGS. 21-25, to the respective supports 78 and 79 are provided limiters 78c and 79c, which when the respective supports are positioned as shown by solid lines in FIGS. 22 and 23, the respective limiters engage the bracket 18f of the moving member 18 to restrain the movement of the respective supports in a direction parallel to the direction in which the aforementioned pins 78a and 79a extend. The position of the respective supports 78 and 79 shown in dash-dot lines in FIGS. 22 and 23 indicates the position at which the respective supports are mounted to the bracket 18f while the position shown in a solid line represents the position at which the respective supports perform the supposed functions thereof. That is, the position indicated by the solid is a position where the supports 78 and 79 are operating and the position indicated by the two-dash line is a position where the supports will not operate in any way.

As is apparent from FIGS. 9 and 21, disposed above the supports 78 and 79 is a clamper cam 82 in the form of arc and mounted to the moving member 18 (refer to FIG. 9) by means of a pin 82a so that the supports move about the center of the arc. FIGS. 28 and 29 show the details of the depressing member 80. As is apparent, particularly from FIGS. 26c and 27, at the middle of the clamper cam 82 are formed cams 82d and 82e each of which engages each of the column-like projections 78 and 79 projecting on the top surface of the supports 78 and 79. In other words, the clamper cam 82 reciprocates to drive the respective supports 78 and 79, thereby mounting the depressing member 80 to and demounting the same from the turntable 23. The aforementioned cams 82d and 82e are constructed so that the supports 78 and 79 move out of engagement with the depressing member after the depressing member 80 has been attracted to the turntable 23, or conversely the depressing member moves out of engagement with turntable 23 after the depressing member 80 has been sandwiched by the respective supports.

As shown in FIG. 21 and FIGS. 26a and 26c, a U-shaped cutout 82f is formed at one end of the clamper cam 82 which engages a projection 71e formed on a first lever member 71 (shown in FIGS. 6, 16, 19a, and 19b) to extend downwardly. In other words, the first lever member 71 reciprocates to cause the clamper cam 82 to move, thereby allowing the supports 78 and 79 to pivot vertically.

A drive means which drives the aforementioned supports 78 and 79, is formed by the aforementioned clamper cam 82, the first lever member 71, the moving member 56 (shown in FIG. 17 etc.), the lock/unlock means (formed of primarily the movable body 74 etc.) which appropriately locks or unlocks the first lever member 71 and the moving member 56 to each other in accordance with the movement of the moving member 56, and the drive force adding means which primarily includes the motor 62 and provides the moving member 56 with a driving force. Also, the driving means the supports 78 and 79 form a depressing-member moving means which causes the depressing member 80 to be detachably mounted to the turntable 23. Both the depressing-member moving means and the depressing member 80 form a clamp mechanism for clamping the disk 10. As shown in FIGS. 22 and 23, a spring (not shown) is provided for urging the respective supports 78 and 79 such that the depressing member 80 approaches the disk carrying surface 23a (refer to FIG. 10) of the turntable 23.

FIG. 10 shows a view taken along the line X—X of FIG. 21. As is apparent from FIG. 10, at the free end of the support 78 there is formed a taper 78g that engages the outer diameters of the main body 81 of the depressing member 80 to position the depressing member relative to the turntable 23, in this case, positioning in the plane parallel to the disk carrying surface 23a of the turntable 23. By this arrangement, alignment of the center of the depressing member 80 may be effected with respect to the turntable 23 with high precision.

The shapes of the turntable 23 and the depressing member 80 will be described in detail.

As is apparent from FIG. 10, to the depressing member 80 there is mounted a disk center aligning projection 80a which fits the center hole of the disk 10 to align the center of the disk relative to the depressing member 80. On the turntable 23 there is provided a recess 23c into which the disk center aligning projection fits when clamping the disk. By this arrangement, the positional error of the disk 10 in the direction parallel to the disk carrying surface 23c of the turntable 23 can be prevented.

The aforementioned clamp mechanism causes the disk 10, which is placed on the trays 11 and 12 projected outwardly of the magazine body 8 by the aforementioned projecting means, to move in a direction perpendicular to the disk carrying surface 23a (FIG. 10) of the turntable 23, i.e., vertical direction (in the direction of Z).

As shown in FIGS. 6 and 9, on the moving member 18 there is provided a disk-retaining member driving cam 87 in the form of an arc and mounted to the moving member 18 by means of a pin 87a such that the cam 87 can move about the center thereof. FIGS. 30a–30d show the details of the disk-retaining member driving cam 87. As shown in FIGS. 9 and 30a–30d, an opening 87c is formed in one end of the disk-retaining member driving cam 87 into which a pin 82h (referred to FIG. 9 and FIGS. 26a and 26b) projects upwardly at the end of the aforementioned clamper cam 82. In other words, the disk-retaining member driving cam 87 moves with the movement of the clamper cam 82. The disk-retaining member driving cam 87 abuts through the pad 88a the surface of the disk that will not face the disk carrying surface 23a, which the disk being moved from the tray 11 or tray 12 in a direction perpendicular to the disk carrying surface 23a of the turntable 23 by means of the aforementioned clamp mechanism, thereby driving a disk retaining member 88 (shown in FIGS. 6 and FIGS. 31a and 31d) that maintains the disk 10 parallel to the disk carrying surface.

The disk retaining member driving cam 87 has formed in its longitudinal direction three taper cams 87d–87f, and two pins 88b and 88c formed on the disk retaining member 88 are smoothly and slidably in contact with the taper cams 87d, respectively. In other words, when the arcuate disk retaining member driving cam 87 moves along its curvature, the disk retaining member 88 moves vertically while it is in contact with the disk 10. On the other hand, as shown in FIGS. 6 and 11, to the chassis 16 are mounted two detection switches 89 and 90 in line with detection switches 34 and 35. The two switches 89 and 90 engage the moving member 56 that are driven by the motor 62 to detect the position to which the moving member has moved.

The previously described control unit detects by means of a detection signal outputted from the detection switch 89 that the respective trays 11 and 12 of the magazine 5 have been accommodated in the magazine body 8, and detects by means of another detection signal from the other detection switch 90 that the respective trays 11 and 12 have been projected outwardly of the magazine body 8 and that the disk on the tray has been clamped to the turntable 23.

FIGS. 32a and 32b show the details of the previously mentioned tray engagement member 53. FIGS. 33a and 33b illustrate the detail of the gear 57 that meshes with a rack 56a (FIGS. 17a, 17b, and 17d) of the previously described moving member 56 (FIGS. 6, 16, and 17). The gear 57 is of a construction in which a large gear (no reference number) and a pinion 57a are formed integrally and the gear 57 meshes with the rack 56a through the pinion 57a.

Figure 17A:
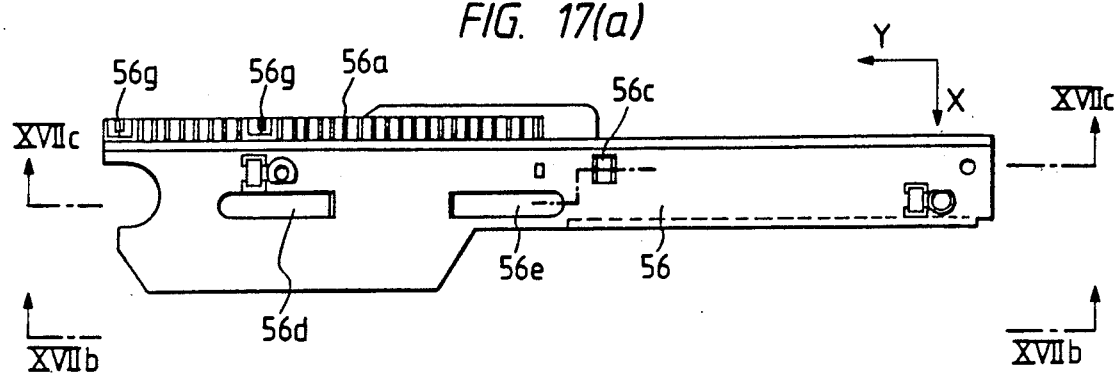
Figure 17B:
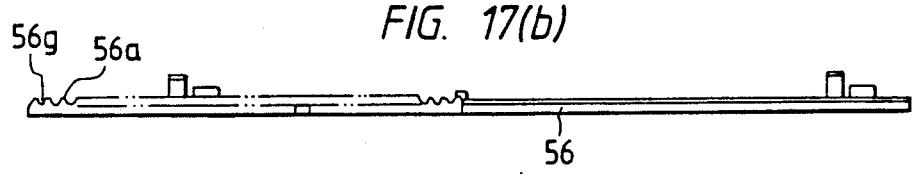
Figure 17C:
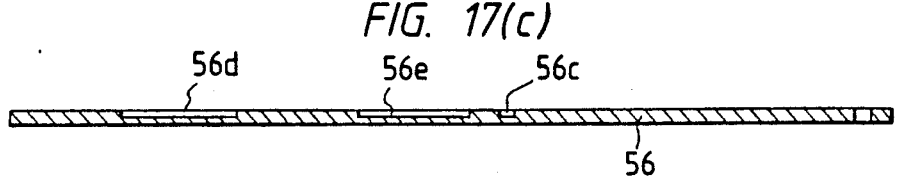
Figure 17D:
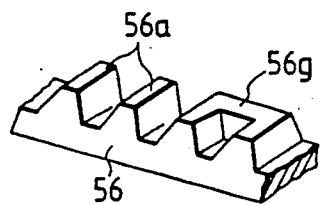
Figure 19A:
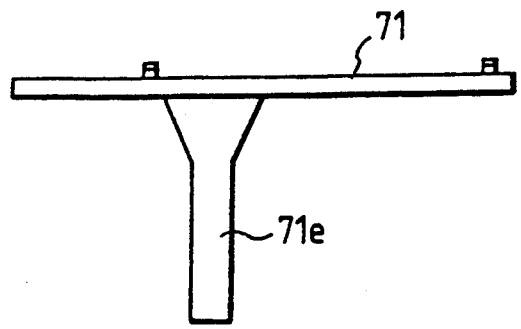
Figure 19B:
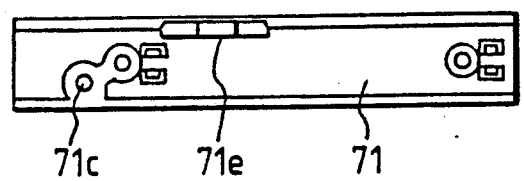
Figure 20A:
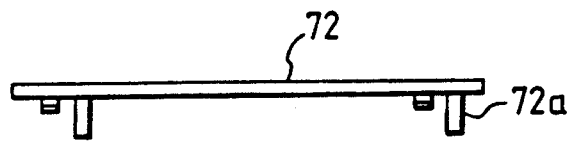
Figure 20B:
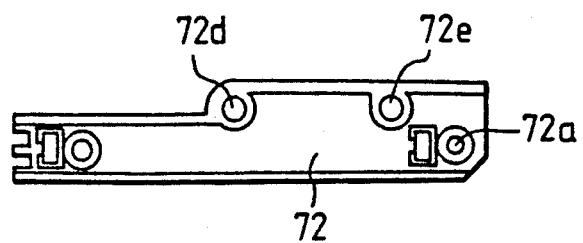

As shown in FIGS. 33a and 33b, the pinion 57a of the gear 57 has cutout 57b in one of the teeth thereof. As shown in FIGS. 17a, 17b, and 17d, two projections 56g are formed in the rack 56a of the moving member 56 which meshes with the pinion 57a. In other words, when the pinion 57a of the gear 57 is to mesh with the rack 56a when assembling the disk player, the gear 57 and the moving member 56 are adapted to operate only when the cutout 75b and the projection 56g are in alignment with each other.

FIGS. 34a to 34c show a lock member 67 (shown in FIG. 8) which engages at the claw 67a thereof the engagement recess 5g of the magazine 5 to thereby lock the magazine 5 to the loading position of the player housing 2.

The lock member 67 pivots between a first position indicated by a two-dot dash line and a second position indicated by a solid line in FIG. 34a. The first position is where the magazine 5 is locked and the second position is where the magazine 5 is unlocked. While not shown, a leaf spring is provided as a biasing means for biasing the lock member 67 so that the claw 67a of the lock member 67 engages the aforementioned recess 5g of the magazine 5.

As shown in FIGS. 34b and 34c, to the sidewall of the lock member 67 is formed a projection 67c. When the lock member is at the second position or in the vicinity thereof the projection 67c engages the recess 57d formed in the gear 57 shown in FIG. 33 to limit the rotation of the gear.

As shown in FIG. 8 and FIG. 34b, the lock member 67 is rotatably mounted to the vertical side wall 16c of the chassis 16 by passing a pin 67e through an insertion hole (not labeled) in the bracket 16e projected from the vertical side wall 16c.

As shown in FIGS. 34a to 34c, the lock member 67 has restrictions 67g and 67h that engage the bracket 16e to restrict the movement of the lock member in a direction parallel to the direction in which the pin 67e extends when the lock member 67 takes up the position indicated by the solid line in FIG. 34c. The lock member 67 is mounted to the bracket 16e when it is at the position shown by the two-dot dash line in FIG. 34c, and performs its locking operation when the lock member 67 is at the position shown by the solid line.

The previously described disk playback means will now be described with reference to FIGS. 35-37.

As shown in FIGS. 35a-35d, the carriage 24 carrying the optical pick up means is pivotally mounted to a carriage base 101 by means of a pin 102 so that so-called tangential adjustment of the optical pick up means may be performed. While not shown, an adjusting mechanism is provided for adjusting the carriage 24 in the tangential direction by allowing the carriage 24 to pivot about the pin 102. FIGS. 36a-36e illustrate the detail of the carriage base 101.

The carriage base 101 is movably supported by two guide shafts 103 and 104 which extend in parallel to the disk carrying surface of the turntable 23 and function as a guiding member. In detail, the guide shaft 103 slidably fits the carriage base 101, and the guide shaft 104 is supported in sandwiched relation by a pair of rollers 106a and 106b which are provided at the free ends of the leaf spring 106 mounted to the carriage base 10. The guide shafts 103 and 104 are fixed below the underside of the carrying plate 22 that supports the turntable 23. On the underside of the carrying plate 22 are provided a pair of elongate magnetic circuits formed of an elongate magnet 108 and an elongate yoke 109 which extend in the longitudinal direction of the guide shafts 103 and 104 and are connected to each other. As shown in FIG. 35d, on the top surface of the carriage base 101 is mounted a pair of driving coils 110 the center axes of which are parallel to the moving direction of the carriage base. The elongate magnetic circuit generates a magnetic flux that intercepts the driving coil 110 to form together with the driving coil a linear motor or quickly responding driving means, which moves the pick up.

Next, a fastening means for fastening the aforementioned pick up to the player housing will be described.

As shown in FIGS. 6, 9, 35a, 35c, 35d, and FIGS. 36a-37, to the sidewall of the carriage base 101 is formed a rack 101a which extends in the direction in which the carriage base moves.

Figure 35C:
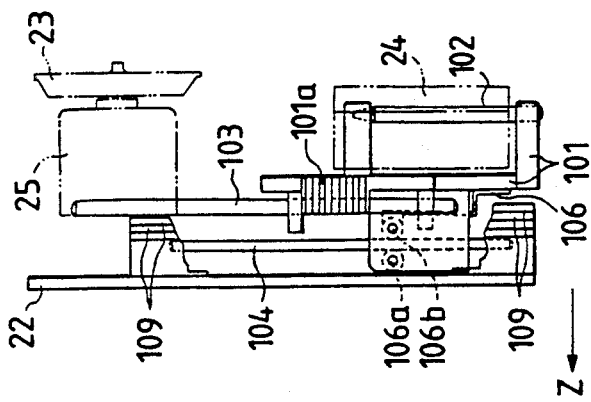
Figure 35A:
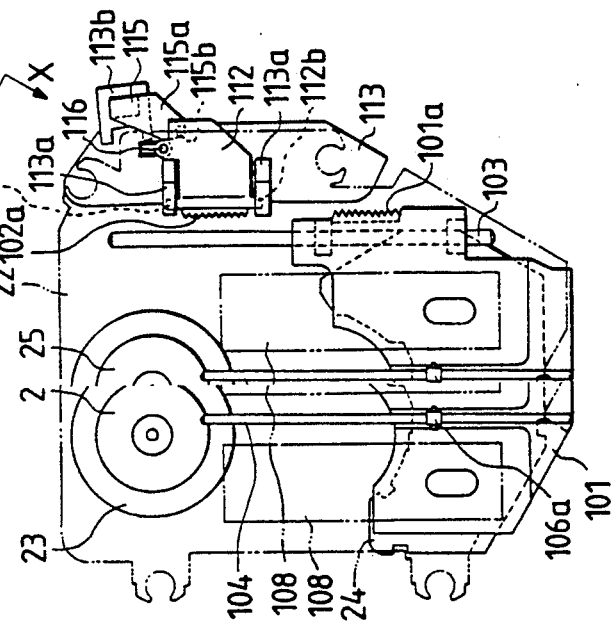
Figure 35D:
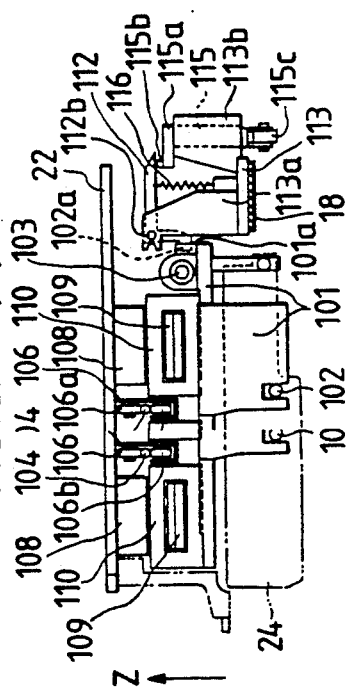
Figure 35B:
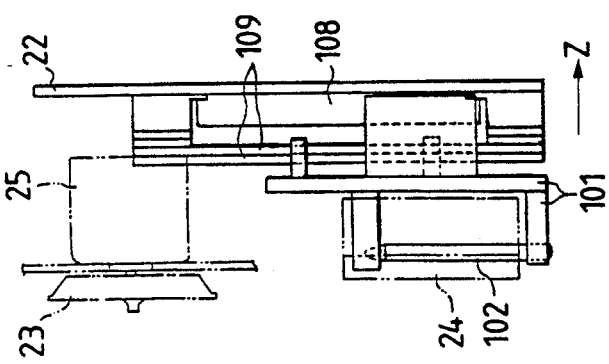
Figure 36A:
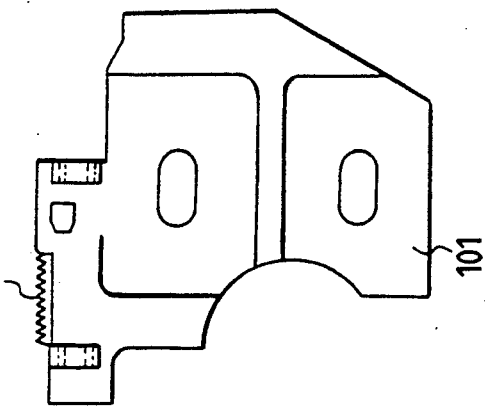
Figure 36B:
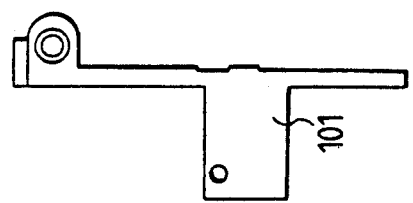
Figure 36E:
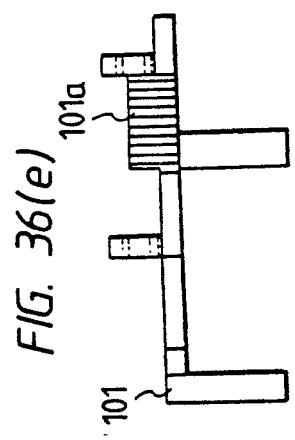
Figure 36C:
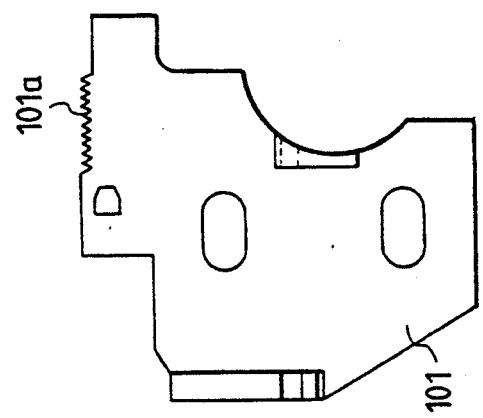
Figure 36D:
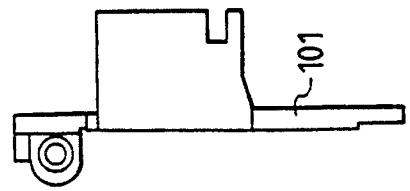
Figure 37:
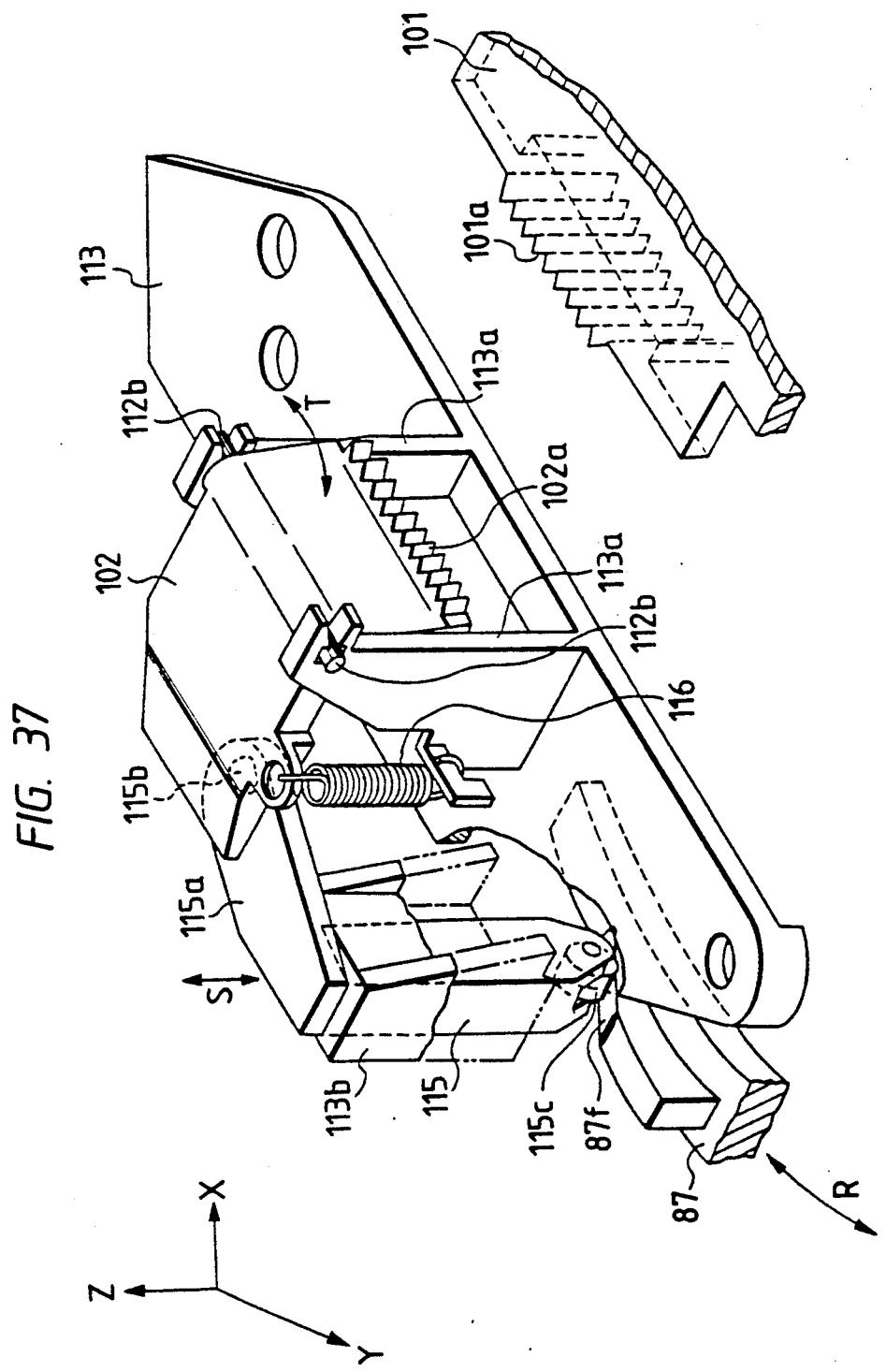

As shown in FIGS. 35a, 35d, and FIG. 37, a lock lever 112 has a rack 102a that meshes with the rack 101a of the carriage base 101.

As is apparent from FIG. 35d, the lock lever 112 is pivotally mounted to the lock base 113 which is fixed through a screw not shown to the top surface of the moving member 18 (shown in FIGS. 6 and 9) opposing the carrying plate 22. In detail, as is apparent from FIG. 37, the lock lever 112 is generally L-shaped in cross-section and is pivotally supported by a pair of brackets 113a formed in the lock base 113 by means of a pin 112b projected from the corner of the L-shape.

On the lock base 113 is formed a hollow, rectangular column 113b projecting upwardly in the proximity of the bracket 113a. Through the column 113b slidably inserted is a lock slider 115. On the upper end of the lock slider 115a is formed an abutment extending horizontally, and a semisphere-like projection 115b projected from the topside of the abutment 115a is in smooth contact with the underside of one end of the lock lever 112. At the lower end of the lock slider 115 is provided a roller 115c which abuts the taper can 87f formed on the disk retaining member driving cam 87, which is a previously mentioned movable member. To the lock lever 112 is connected a coil spring 116 which urges the lock lever so that the rack 102a of the lock lever 112 approaches the rack 101a of the carriage base 101.

In other words, the movable member or disk retaining member driving cam 87 reciprocates (in a direction of an arrow 4) to cause the lock slider 115 to reciprocate (in a direction of an arrow S), thereby the lock lever 112 pivots (in a direction of an arrow T) so that the rack 102a of the lock lever is driven into and out of meshing engagement with the rack 101a of the carriage base 101.

The carriage base 101 having the rack 101a is referred to as a first rack member while the lock lever 112 having the rack 102a which meshes with the rack 101a is referred to as a second rack member.

The aforementioned carriage base 101, the lock lever 112, the coil spring 116 that urges the lock lever 112 form a fastening means for fastening the optical pick up means to the player housing. The fastening means is part of the disk moving means which supplies the disk playback means with the disk in the magazine 5 and returns the same disk to the magazine 5 for storage. That is, the driving force for moving the disk between the magazine 5 and the disk playback means is used as a driving force for fastening the optical pick up means. The disk moving means causes the aforementioned fastening means to fasten the optical pick up means to the player housing after the disk is supplied to the disk playback means.

Figure 38:
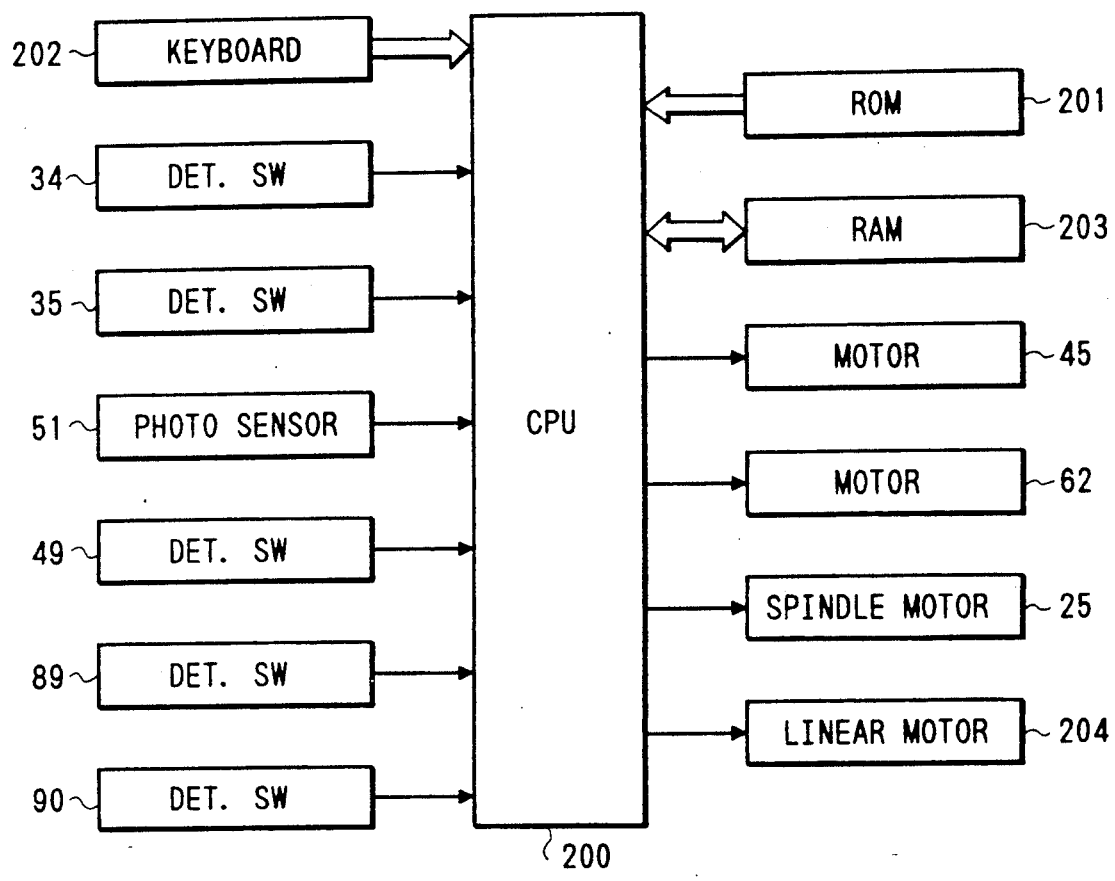
FIG. 38 is a block diagram of the control system for the magazine disk player shown in FIGS. 1–37.

FIG. 38 shows the construction of the controller which controls the operation of the magazine disk player of the aforementioned construction. Under control of a control program pre-stored in a ROM 201, a CPU 200 cooperates with a RAM 203 to issue instructions to the motors 45 and 62, the spindle motor 25 and the linear motor 204 in response to the signals from the detection switches 34, 35, 49, 89, 90 and photosensor 51 as well as from a keyboard 202 formed of a group of switches of the operation unit 6 (shown in FIG. 1).

One example of the aforementioned control program will now be described with reference to a flowchart in FIG. 39 and operation-illustrative diagrams in FIGS. 40a and 40b.

Figure 39:
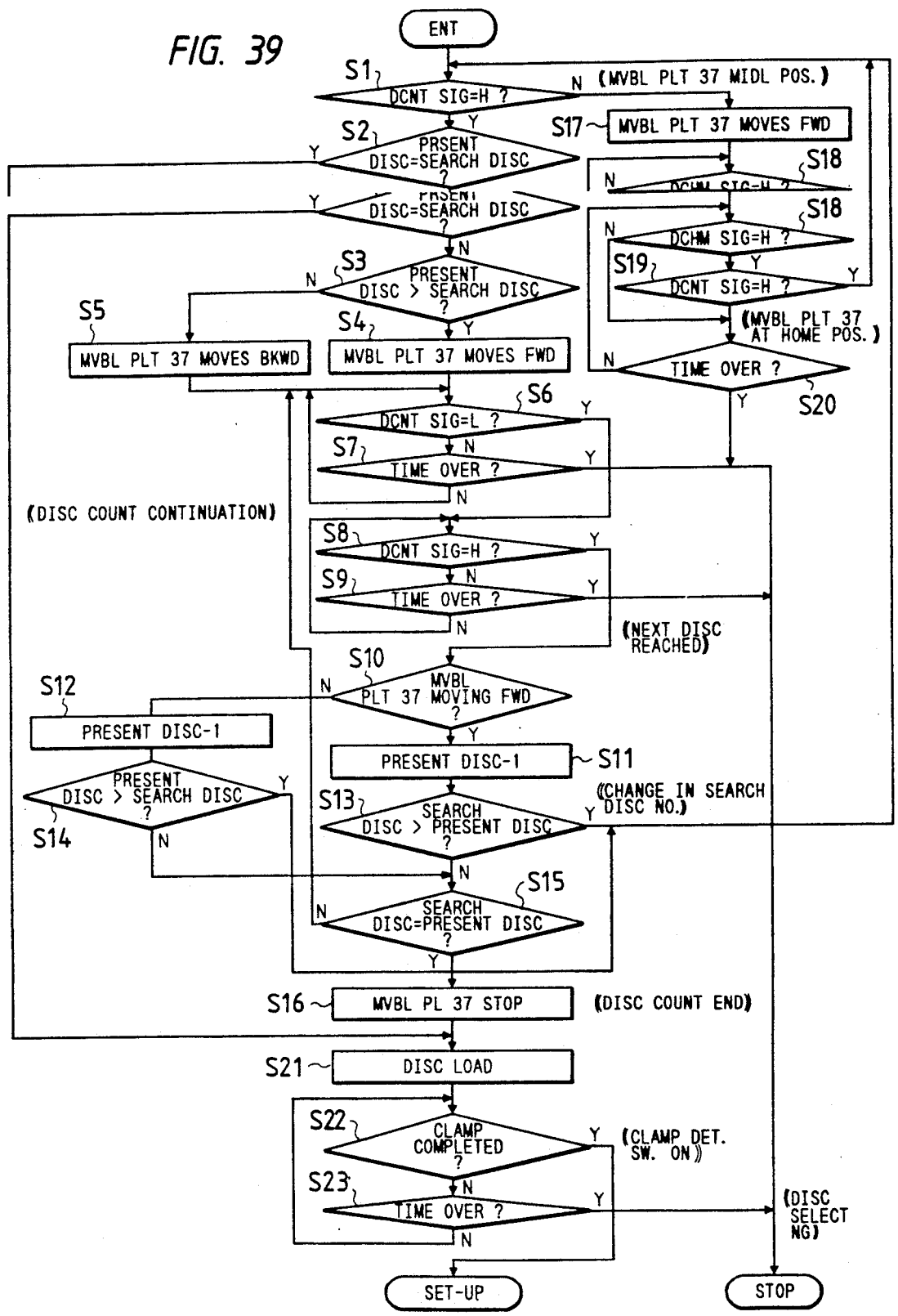
FIG. 39 is a flowchart for illustrating the operation of magazine/disk player shown in FIGS. 1–37.

When the keyboard 202 (shown in FIG. 38) of the operation buttons 6 is operated to issue a playback instruction for playing back a desired disk, the disk player operates in accordance with the flowchart in FIG. 39. A DCNT signal shown in FIG. 39 is a detection signal generated from the detection switch 46. A DCHM signal is a signal supplied from the detection switch 49 which detects the moving plate 37 at its fully ejected position (movement limit in forward direction) or its home position.

As shown in FIG. 39, when the playback instruction is issued, the control unit makes a decision based on whether or not the DCNT signal is issued (step 1). If the DCNT signal is issued, then the moving plate 37 is moved by a distance corresponding to the difference between a present address (present DISC) and a desired address (search DISC); if the detection switch 46 does not issue the DCNT signal, the moving plate 37 is once returned to its fully ejected position and is then moved to the desired address position (search DISC) to stay there till the detection switch 49 issues the DCHM signal. The operation will be described below in detail.

When the DCNT signal is issued, the control unit 5 makes a decision based on whether or not the present address is the desired address (step 2). If the present address is equal to the desired address, then a later described disk loading operation is entered; if not, the present address is compared with the desired address (step 3) to cause the motor 45 to rotate in the forward (step 4) or reverse direction (step 5). If the DCNT signal is counted by one (steps 6-9) during the movement of the moving plate 37, a decision is made based on whether or not the moving plate is moving forwardly or rearwardly (step 10). If the moving plate is moving forwardly, then the "present DISC minus one" is set as a new present address (step 11); if the moving plate is moving rearwardly, the "present DISC plus one" is set as a new present address (step 12). Then, the new present address is compared with the desired address (steps 13 and 14), the steps 13-14 are repeated until the present address is equal to the desired address, and the moving plate 37 is stopped when the two addresses are equal (step 16). During this operation of positioning the moving plates 37 and 38, the cam grooves 37d and 38d formed in the moving plates 37 and 38 cooperates with the bracket 16e formed in the chassis 16 to vertically move the pin 18a which movably engages the respective grooves, thus allowing the moving member 18, from which the pin 18a projects, to move vertically. In this manner, the playback means including the turntable provided on the moving member 18 and the tray engagement member 53 reach a position corresponding to the trays 11 and 12 that carry the disk to be played back. Thereafter, a later described disk loading operation is performed.

In the case where the playback instruction is issued when the DCNT signal is not issued, the moving plate 37 is move forwardly (step 17) to take up the home position till the detection switch 49 issues the DCHM signal (step 18), and is moved to the position of the desired address upon the DCNT signal (step 19). The operation of positioning the moving plate 37 to the desired address after the DCHM signal is issued is carried out by following the aforementioned steps 1-16. If the DCNT signal is not issued even when the moving plate 37 is returned to the home position, an alarm is issued after a predetermined length of time to stop the operation.

Following the above operation, the playback means and the tray engagement member 53 are located at the vertical position corresponding to the tray carrying the disk to be played back. The disk loading operation will now be described. A schematic of this operation is illustrated in FIG. 41; the detailed structure and interrelationships being illustrated in prior mentioned Figures.

The motor 62 begins to run to drive the moving member 56 rearwardly (in the direction opposite to the arrow Y). At this time, the moving member 56 is locked to the second lever member 72 by means of the lock/unlock means formed primarily of the movable bodies 75 and 76 (refer to FIG. 16). The first lever 71 is not locked to the moving member 56. Thus, only the second lever member 72 moves rearwardly together with the moving member 56, thereby the tray engagement member 53 rotates counterclockwise in FIG. 9. Thus, as shown in FIG. 2b, the tray (for example the trays B 12) carrying the disk to be played back is ejected from the magazine body 8, and as shown in FIG. 40a, the disk moves to a position where the disk is concentric with the disk carrying surface 23a (refer to FIG. 10) of the turntable 23, i.e., to a position right below the disk carrying surface.

Thereafter, when the moving member 56 moves rearwardly (in the direction opposite to the arrow Y), the second lever member 72 becomes out of locked engagement with the moving member 56 while at the same time the first lever member 71 is locked with the moving member. Thus, the first lever member 71 moves rearwardly together with the moving member 56 driving the clamper cam 82 to cause the supports 78 and 79 of the clamp mechanism (shown in FIG. 23) to pivot upwardly (in the direct of the arrow Z). Therefore, as shown in FIG. 40b, the disk is lifted upwardly and is clamped to the turntable 23 (step 22). The upward movement of the disk is shown as DISC load in FIG. 39 (step 21). If the clamp completion signal is not issued a predetermined time after the disk loading operation is carried out (step 23), a warning such as an alarm is issued and the operation is terminated.

The disk retaining member driving cam 87 coupled to the clamper cam 82 is driven in synchronism with the aforementioned clamping operation, which causes the disk retaining member 88 and the depressing member 80 of the disk clamping mechanism to ascend with the disk being held therebetween. Thus, the disk is prevented from being misaligned.

As shown in FIG. 37, the movement of the disk retaining member driving cam 87 permits the lock slider 115 to ascend. Therefore, the rack 102a of the lock lever 102 moves out of engagement with the rack 101a of the carriage base 101, thereby disconnecting the optical pick up from the player housing.

In this manner, the disk player is ready to play back the disk, the turntable is rotated, the linear motor is powered on for the carriage 24 (refer to FIG. 9) carrying the optical pick up to operate, and the playback of the disk is begun.

When the playback of the disk is over and the disk is replaced to the magazine body 8, the operation of replacing the disk is to follow, in the reverse direction, the previously described disk loading operation. Thus the detailed description is omitted.

In addition, together with the operation of replacing the disk into the magazine, the fastening means including the lock lever 102 follows the previously described disk loading operation but in the reverse direction thereof so that the carriage 24 which carries the optical pick up is fastened to the player housing upon the completion of the playback of the disk.

FIG. 41 illustrates the general internal mechanism of the magazine disk player.

As described in detail, in a multi-disk player according to the present invention, the disk-moving means, which supplies the playback means with the disk from the disk-accommodating chamber as well as replaces the disk in the disk accommodating chamber after the playback operation is over, is provided with a fastening or locking means for fastening the pick up to the player housing, thus making use of the driving force that moves the disk between the disk accommodating chamber and the playback means for additionally fastening the pick up.

Such a construction eliminates a driving source particularly provided for fastening the pick up, permitting a lower cost of the disk player.

What is claimed is:

1. A multi-disk player comprising:
   a disk accommodating chamber provided in a player housing and capable of accommodating a plurality of disks in alignment with each other;
   a playback means for receiving a disk selected from said disk accommodating chamber and playing back said disk, said playback means including a pick up and a guide drive means for guiding and causing the pick up to move, said playback means being movable relative to said disk accommodating chamber;
   a positioning means for positioning said playback means with respect to said disk accommodating chamber;
   a disk-carrying means for supplying the playback means with said disk selected from said disk accommodating chamber upon completion of the positioning of said playback means and for reinserting said disk in said disk accommodating chamber upon completion of the playback operation of said disk, said disk-carrying means being mounted so as to be movable in a substantially vertical direction;
   wherein said guide drive means comprises a guide member for guiding said pick up, and a quickly-responding driving means for causing said pick up to move; and
   wherein said disk-carrying means includes a fastening means for fastening the pick up to the player so as to be unmovable when fastened.

2. A multi-disk player according to claim 1, wherein said disk-carrying means further comprises means for causing said fastening means to unfasten said pick up after the disk-carrying means supplies said playback means with the disk.

3. A multi-disk player according to either claim 1 or claim 2, wherein said fastening means comprises:
   a first rack member provided in fixed relation with said pick up;
   a second rack member movable between a fastening-position at which the second rack member is in mesh engagement with said first rack member and a releasing-position at which the second rack member is out of mesh engagement with said first rack member; and
   an urging means for urging said second rack member toward said fastening position.

4. A multi-disk player according to either claim 1 or claim 2, wherein said disk-carrying means further comprises a movable member adapted to reciprocate in a predetermined direction to cause the disk to move between said disk accommodating chamber and said playback means; and
   a driving means for causing said movable member to move.

5. A multi-disk player according to claim 3, wherein said disk-carrying means further comprises a movable member adapted to reciprocate in a predetermined direction to cause the disk to move between said disk accommodating chamber and said playback means; and
   a driving means for causing said movable member to move.

6. A multi-disk player according to either claim 1 or claim 2, wherein said positioning means comprises means for selectively moving said playback means along an axis parallel to an axis of alignment of said disks in said disk accommodating chamber to a stop position adjacent said selected disk.

7. A multi-disk player according to claim 3, wherein said positioning means comprises means for selectively moving said playback means along an axis parallel to an axis of alignment of said disks in said disk accommodating chamber to a stop position adjacent said selected disk.

8. A multi-disk player according to claim 4, wherein said positioning means comprises means for selectively moving said playback means along an axis parallel to an axis of alignment of said disks in said disk accommodating chamber to a stop position adjacent said selected disk.

9. A multi-disk player according to claim 5, wherein said positioning means comprises means for selectively moving said playback means along an axis parallel to an axis of alignment of said disks in said disk accommodating chamber to a stop position adjacent said selected disk.

10. A multi-disk player according to claim 1, wherein said disk carrying means further comprises:
    moving member means operative to move in a first direction to initiate transfer of a selected disk from said chamber to said playback means and to initiate unfastening of said fastening means, and operative to move in a second direction, opposite said first direction, to initiate fastening of said fastening means and to initiate transfer of said disk from said playback means to said chamber;
    first lever member movable in locking relation with said moving member during a portion of the movement of said moving member;
    clamper cam means operable by movement of said first lever member in said first direction to clamp said disk into a playback position within said playback means, and operable by movement of said first lever member in said second direction to unclamp said disk;
    disk retaining means driving cam operable by movement of said first lever means in said first direction for causing said fastening means to unfasten said pick up from said player, and operable by movement of said first lever means in said second direction for causing said fastening means to fasten said pick up to said player;
    second lever means movable in locking relation with said moving member during a portion of the movement of said moving member; and
    tray engagement member means operable by movement of said second lever means in said first direction for engaging and moving said selected disk from said chamber to a playback position in said playback means, and operable by movement of said second lever means in said second direction for moving said selected disk from said playback position to said chamber;
    wherein first and second lever member means are interlocked with said movable means to cause said first lever member means to move with said movable member during a second portion of the movable member's movement in said first direction and a first portion of movement in said second direction, and to cause said second lever member means to move with said movable member during a first portion of the moveable member's movement in said first direction and a second portion of movement in said second direction, whereby said disk is clamped and said pick up is fastened after said disk is moved to said playback position, and said disk is moved to said accommodating chamber after said disk is unclamped and said pick up is unfastened.

11. A multi-disk player according to claim 10, wherein said disk retaining means driving cam further includes means for retaining said disk in the clamped position.

12. A multi-disk player according to either claim 10 or claim 11, wherein said fastening means comprises:
   a first rack member provided in fixed relation with said pick up;
   a second rack member movable between a fastening-position at which the second rack member is in mesh engagement with said first rack member and a releasing-position at which the second rack member is out of mesh engagement with said first rack member; and
   an urging means for urging said second rack member toward said fastening position.

13. A multi-disk player according to claim 12, wherein said positioning means comprises means for selectively moving said playback means along an axis parallel to an axis of alignment of said disks in said disk accommodating chamber to a stop position adjacent said selected disk.

* * * * *